(12) United States Patent
Munk et al.

(10) Patent No.: US 9,922,114 B2
(45) Date of Patent: Mar. 20, 2018

(54) SYSTEMS AND METHODS FOR DISTRIBUTING INDEXER CONFIGURATIONS

(71) Applicant: Splunk Inc., San Francisco, CA (US)

(72) Inventors: Alexander D. Munk, San Francisco, CA (US); Patrick Lane Ogdin, Ann Arbor, MI (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 14/610,704

(22) Filed: Jan. 30, 2015

(65) Prior Publication Data

US 2016/0224660 A1    Aug. 4, 2016

(51) Int. Cl.
*G06F 17/30* (2006.01)

(52) U.S. Cl.
CPC .............................. *G06F 17/30619* (2013.01)

(58) Field of Classification Search
CPC ......... G06F 17/30864; G06F 17/30619; G06F 17/30321; G06F 17/30424; G06F 17/30613; G06F 17/30961; G06F 17/30067

See application file for complete search history.

(56) References Cited

U.S. PATENT DOCUMENTS

| | | | | |
|---|---|---|---|---|
| 7,966,293 B1 * | 6/2011 | Owara | ................ | G06F 11/1448 707/654 |
| 8,571,882 B1 * | 10/2013 | Teitelbaum | ...................... | 705/2 |
| 8,874,755 B1 * | 10/2014 | Deklich | ................ | G06F 3/0484 709/220 |
| 2002/0078134 A1 * | 6/2002 | Stone et al. | ................... | 709/202 |
| 2003/0093408 A1 * | 5/2003 | Brown et al. | ...................... | 707/2 |
| 2004/0203609 A1 * | 10/2004 | Sameer | ................... | H04W 4/12 455/412.1 |
| 2006/0069635 A1 * | 3/2006 | Ram et al. | ...................... | 705/37 |
| 2007/0220420 A1 * | 9/2007 | Sanders | ........................ | 715/513 |
| 2008/0307175 A1 * | 12/2008 | Hart | ..................... | G06F 11/1461 711/162 |
| 2009/0198669 A1 * | 8/2009 | Shaw et al. | ....................... | 707/5 |
| 2009/0265305 A1 * | 10/2009 | Barsness | ............ | G06F 17/30312 |
| 2012/0059823 A1 * | 3/2012 | Barber | .............. | G06F 17/30584 707/737 |
| 2012/0143873 A1 * | 6/2012 | Saadat | .......................... | 707/741 |
| 2012/0179684 A1 * | 7/2012 | Alba | ................. | G06F 17/30631 707/738 |
| 2012/0233147 A1 * | 9/2012 | Solheim | ............ | G06F 17/30336 707/709 |

(Continued)

*Primary Examiner* — Cam-Y Truong
(74) *Attorney, Agent, or Firm* — Shook, Hardy & Bacon L.L.P.

(57) ABSTRACT

Provided are systems and methods for causing display of an index management graphical user interface (GUI). In one embodiment, a method can be provided. The method can include causing display of an index management GUI including one or more user editable fields for specifying one or more index settings; receiving, via the one or more user editable fields of the index management GUI, one or more user specified index settings; generating an index definition corresponding to the one or more user specified index settings; and distributing the index definition to one or more indexers of a data processing system. The one or more indexers are able to manage storage of data in one or more indexes based at least in part on the index definition.

31 Claims, 36 Drawing Sheets

(56) References Cited

U.S. PATENT DOCUMENTS

| | | | | |
|---|---|---|---|---|
| 2013/0007371 A1* | 1/2013 | Hilerio | ............... | G06F 12/0866 |
| | | | | 711/133 |
| 2013/0013564 A1* | 1/2013 | Ben-Or | ............... | G06F 11/2038 |
| | | | | 707/640 |
| 2013/0041871 A1* | 2/2013 | Das | .................. | G06F 17/30896 |
| | | | | 707/662 |
| 2013/0159281 A1* | 6/2013 | Yang | ................ | G06F 17/30312 |
| | | | | 707/715 |
| 2013/0204890 A1* | 8/2013 | Kamekawa | ................... | 707/758 |
| 2015/0254303 A1* | 9/2015 | Saadat | ............. | G06F 17/30463 |
| | | | | 707/716 |

* cited by examiner

```
Original Search: 1501
search "error" | stats count BY host

Sent to peers: 1502
search "error" | prestats count BY host(map)

Executed by search head: 1503
Merge prestats results received from peers (reduce)
```

SYSTEMS AND METHODS FOR DISTRIBUTING INDEXER CONFIGURATIONS

TECHNICAL FIELD

The present disclosure is generally directed to data processing, and more particularly, to managing data indexes.

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority.

BRIEF DESCRIPTION OF THE DRAWINGS

FIG. 13 illustrates an example search query received from a client and executed by search peers in accordance with the disclosed embodiments.

FIG. 14B illustrates an example data summary dialog that enables a user to select various data sources in accordance with the disclosed embodiments.

DETAILED DESCRIPTION

Figure 1:
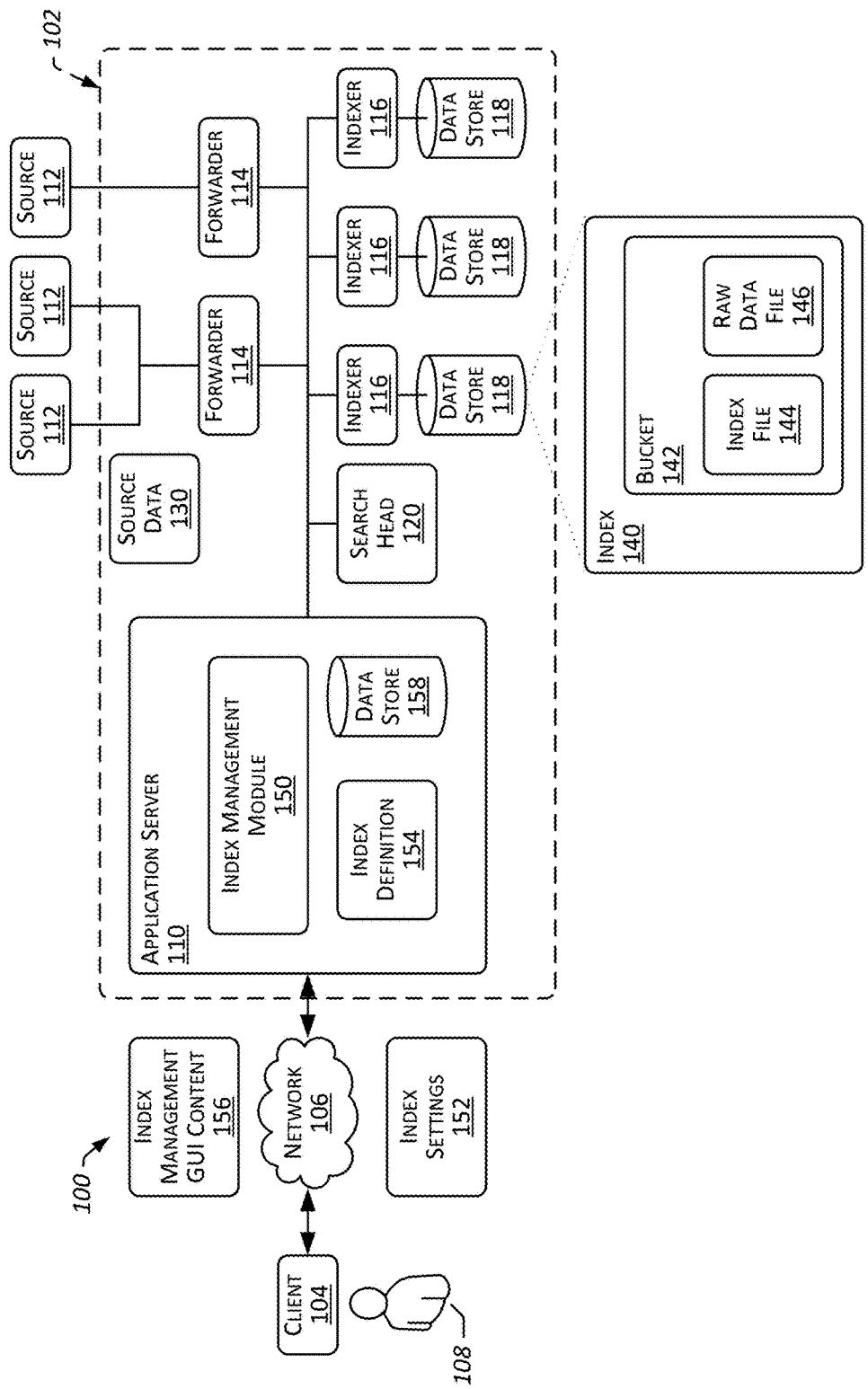
FIG. 1 illustrates an example data processing environment in accordance with the disclosed embodiments.

The present disclosure is directed to managing data indexes. In some embodiments, a user can specify one or more index settings via an index management graphical user interface (GUI), and the specified index settings can be used to generate corresponding index configuration data (also referred to as an "index definition"). The specified index settings can include index settings for a new index to be created and/or edits to index settings for existing indexes. The index definition may then be distributed to one or more entities of a data processing system so that it can be employed by one or more of the entities to manage the creation and/or use of one or more data indexes of the data processing system. For example, in the context of monitoring machine-generated data, a data processing system may include one or more forwarders (e.g., for collecting machine data from one or more data sources, such as data streaming from packaged and custom applications, application servers, web servers, databases, wire data from networks, virtual machines, telecom equipment, operating systems, sensors, and/or the like), one or more indexers (e.g., for receiving, indexing, storing, and/or searching the machine data received from the forwarders), and one or more search heads (e.g., for servicing search requests, including distributing search tasks to one or more indexers and merging the search results received from the one or more indexers). In such a system, for example, index settings can be specified to create and/or edit indexes used to store the incoming data, and define various characteristics of the indexes; an index configuration file may be generated using the specified index settings; and the index configuration file may be distributed to the indexers, the search heads, and the forwarders. These entities can use the index definition to efficiently index, store, and access the machine data.

In some embodiments, machine data can be received as a stream of data that includes multiple events, and the events can include one or more fields. During event processing (e.g., including parsing and indexing of the data), incoming data may be indexed to enable fast search and analysis, and may store the results in the index as events. For example, event processing may include separating the data stream into individual, searchable events; creating or identifying respective timestamps for each of the events; creating or extracting fields such as host, source, and sourcetype for each of the events; performing user-defined actions on the incoming data (e.g., identifying custom fields, masking sensitive data, writing new or modified keys, applying breaking rules for multi-line events, filtering unwanted events, and routing events to specified indexes or servers); and/or the like.

In some embodiments, an index can include a repository for data. Indexing may refer to the collective act of processing raw data and adding the processed data to an index. During indexing, the raw data may be transformed into searchable data. For example, indexing raw atomic units of data (also referred to as "event data") may transform the raw data into searchable data (also referred to as searchable "events"). Indexes may, for example, reside in flat files on an indexer of the data processing system. Indexing may create a raw data file that includes the raw data in compressed form, and index files (also referred to as "tsidx" files) that point to the raw data, and/or the metadata files. Together, these files may constitute an index. The files may reside in sets of directories organized by age, called buckets.

In some embodiments, a default index, such as a "main" index, holds all events by default. Default indexes may include, for example, a "main" index that is a default location for storing all processed data, an "_internal" index for storing internal logs and processing metrics, and/or an "_audit" index that contains events relating to a file system change monitor, auditing, and user search history. An indexer may have access to these default indexes for storing indexed data and searching stored data. In some embodiments, other indexes can be created, for example, by a user. Although multiple indexes may be available, the main index may serve as the default index for any input or search command that doesn't specify an index. For example, if a user defines a server as a data source, but does not specifically identify a destination index for the data to be routed to, the data received from the server may be indexed and stored in the main index. If, however, a user defines a server as a data source, creates a "Server_Data" index, and specifies that the Server_Data index is the destination for data from the server, then the data received from the server may be indexed and stored in the Server_Data index. In the context of searching data, if a user submits a search query, but does not specifically identify an index to be searched, then the search may be conducted on the indexed data of the main index. If, however, a user submits a search query that specifies searching the Server_Data index, then the search may be conducted on the indexed data of the Server_Data index.

In some embodiments, multiple indexes are created to control user access, to accommodate varying retention policies, and/or to improve searching performance. With regard to user access, multiple indexes may be created such that different persons can be given access to different sets of data. For example, a first index may have an access policy that enables it to be searched by users with only a high level of permission, and a second index may have an access policy that enables it to be searched by users with at least a low level of permission. That is, the system can limit user searches to specific indexes based on the user's predefined role or position. With regard to retention policies, multiple indexes may be created such that the data can be subject to different retention policies. For example, a first index may have a retention policy that causes data to be discarded if it is at least 1 month old, and a second index may have a retention policy that causes data to be discarded if it is at least 2 months old. That is, data can be sent to different indexes with different retention policies for each index. With regard to search performance, multiple indexes may be created such that searches can be performed on specific subsets of data. For example, a first index may include data received from a customer's e-mail servers, and a second index may include data received from a customer's Internet servers. Thus, if the customer is only interested in searching data relating to the e-mail servers, then the customer can conduct a search over the first index's data for the e-mail servers. This can improve performance by eliminating extraneous searching across the second index's data for the Internet servers. That is, data can be sent to one or more dedicated indexes, and searches can be run on one or more dedicated indexes to limit the scope of the search.

In some embodiments, indexes can be created and/or characteristics of the indexes can be specified by one or more index settings of an index definition. The index settings may specify the different indexes that should exist and the characteristics for each of the respective indexes, such as a name of the index, a maximum size of the index, a retention policy for the index, a permission for the index, and/or the like. In some embodiments, the index settings can be submitted by a user via an interactive index management graphical user interface (GUI), the index settings can be used to generate an index configuration file including the index definition (e.g., an "indexes.conf" file), the entities that rely on the index configuration file can be identified as interested entities of the data processing system, the index configuration file can be automatically distributed to the interested entities of the system, and the entities can use the index settings of the index configuration file to create, manage, and use the respective indexes of the system. Thus, such a system may enable a user, such as a customer of the data processing system, to specify index settings for an index definition via an easy-to-use GUI, and automatically deploy the resulting index definition.

Although some embodiments are described with regard to certain example index settings (e.g., a name of an index, a maximum size of an index, a retention policy for an index, a permission for an index, index enable/disable, and/or the like) for the purpose of illustration, it will be appreciated that embodiments can be applied with any suitable settings (e.g., data paths, such as a home, cold, thawed paths and/or the like; data bucket maximum sizes, such as hot, warm, cold, frozen bucket maximum sizes, and/or the like described in more detail below). Moreover, although some embodiments provide for the display of certain example index settings (e.g., a name of an index, a maximum size of an index, a retention policy for an index, a permission for an index, index enable/disable, and/or the like) for the purpose of illustration, it will be appreciated that embodiments can include display of various index settings.

Turning now to the figures, FIG. 1 illustrates an example data processing environment ("environment") 100 in accordance with the disclosed embodiments. In some embodiments, the environment 100 can include an event-processing system ("system") 102 communicatively coupled to one or more client devices 104 via a communications network 106. The client device 104 may be used or otherwise accessed by a user 108, such as a system administrator or a customer.

In some embodiments, the system 102 can include an application server 110, one or more data sources ("sources") 112, one or more forwarders 114, one or more indexers 116, one or more index data stores 118, and/or one or more search heads 120. As described herein, data may be indexed and stored in one or more indexes 140. An index 140 can include a logical grouping of data (e.g., having common characteristics). As further described, an index 140 can include one or more buckets 142, and each of the buckets 142 can include an index file 144 and/or a raw data file 146. A raw data file 146 may include raw source data 130 in compressed form. An index file 144 may include index data that points to the location of certain data within the raw data file 146.

A bucket 142 may be a directory containing part of an index 140. An index 140 may consist of one or more buckets 142 organized, for example, by age, and which may roll through one or more stages in their transition to retirement and eventual archiving or deletion. The stages may include a hot stage, a warm stage, a cold stage, a frozen stage, and a thawed stage. The data may transition across the stages in the following order as the data ages: hot, warm, cold, frozen, thawed. Each of the stages may be associated with a corresponding bucket that holds data for that stage. A hot bucket may be a location to store data subject to intensive read and write operations, e.g., where the indexing occurs. A warm bucket may be a location to store data subjected to mostly read and optimization operations. A cold bucket may be a location to store data subjected to search operations. The frozen bucket may be a location to store data that is queued for deletion or archiving. A thawed bucket may be used to re-import data from frozen buckets. Freshly indexed data may start out in a hot bucket that is actively being written to. The data of a hot bucket may be stored temporarily in a memory location, such as in flash memory. When the hot data bucket reaches a specified size or age, it may be transitioned into (or "rolled to") warm data bucket, and a new hot data bucket may be created. Similar to the hot bucket, the data of a warm bucket may be stored temporarily in a memory location, such as flash memory. After some time, the warm bucket may transition into a cold bucket. The data of a cold bucket may be stored in a more permanent location that remains searchable, such as a hard drive. A cold bucket may eventually transition into a frozen bucket, and a frozen bucket may be deleted or archived. The data of a frozen bucket may be stored an archive that is not readily searchable, such as a tape drive. If data is to be returned to a cold bucket, it may be moved in a thawed bucket, during its transition from the frozen bucket to the cold bucket, such as during its transition from a tape drive to the hard drive. For example, a "homePath" may specify a directory or location for the hot and/or warm buckets (e.g., $SPLUNK_HOME/var/lib/splunk/defaultdb/db/), a "cold-Path" may specify a directory or location for a cold bucket (e.g., $SPLUNK_HOME/var/lib/splunk/defaultdb/colddb/), a "thawedPath" may specify a directory or location for a thawed bucket (e.g., $SPLUNK_HOME/var/lib/splunk/defaultdb/thaweddb/), and so forth. The states of various buckets and/or the discarding or archiving of data may be based on data retention settings for the index 140. As described herein, the data retention settings for an index may be specified by an index definition.

A raw data file 146 may be a compressed file in an index bucket 142 that contains event data, as well as journal information that the indexer can use to reconstitute the index's metadata files ("index files"). A searchable copy of a bucket 142 may contain both the raw data file 146 and a corresponding set of index files 144. A non-searchable copy (e.g., stored for the purposes of redundancy, but not immediate searching) may contain only the raw data file 146. Such a non-searchable copy may take up less disk space, and can be converted into a searchable copy with some processing.

An index management module 150 (e.g., executed by the application server 110) may receive index settings 152 (e.g., specified by a user via an index management application of a client device 104), generate an index definition 154 using the index settings 152, and/or provide for the creation and use of indexes 140 based on the index definition 154. In some embodiments, the index settings 152 are submitted by a user via an index management graphical user interface (GUI) displayed or otherwise presented to the user via the client device 104. In some embodiments, to effectuate the display of the index management (GUI), the index management module 150 provides corresponding index management GUI content 156 to the client device 104, and the client device 104 renders the index management GUI content 156 for display to the user 108 via a display device (e.g., a display screen) of the client device 104. In some embodiments, the index definition 154 can be stored locally (e.g., in a data store 158), and/or can be distributed to other entities of the environment 100 and/or the system 102 for use in creating and managing the indexes 140. For example, the index management module 150 may generate an index configuration file (e.g., an "indexes.conf" file) including the index definition 154, and distribute the index configuration file to interested entities of the system 102, such as the search head 120 and the indexers 116. In some embodiments, the index definition 154 may be distributed in a hierarchical manner. For example, the index management module 150 may identify one or more indexer clusters that will create and manage the indexes defined in the index definition, the index management module 150 may push (or otherwise distribute) the index configuration file to a master node of the one or more indexer clusters, and the master node may be responsible for distributing the configuration file to the other nodes of the cluster, such as peer nodes and search heads of the cluster. In some embodiments, the index definition 154 may be distributed in in response to a query from one or more entities. For example, one or more entities (e.g., indexers 116 or search heads 120) may query the index management module 150 for an updated index definition, and the index management module 150 may transmit the index definition 154 to the one or more entities in response to the query. In some embodiments, an index definition 154 may be distributed according to a schedule. For example, the index management module 150 may push (or otherwise distribute) the index configuration file to a master node of the one or more indexer clusters hourly, daily, weekly, monthly or the like. This may help to synchronize the entities of the system 102, ensuring that they have and are employing the same version of index definition 154. In some embodiments, an index definition 154 can include changes to index setting for multiple indexes 140 such that distributing a single index definition 154 can effectuate changes for multiple indexes 140. As described herein, a search head 120 may use the index configuration file to identify the indexes 140 that can be searched. An indexer 116 may use the index configuration file to determine what indexes should be created and/or how to index incoming source data 130 (e.g., including which index 140 to route the incoming data to).

The network 106 may include an element or system that facilitates communication between the entities of the environment 100 (e.g., including the application server 110 and the client devices 104). The network 106 may include an electronic communications network, such as the Internet, a local area network (LAN), a wide area network (WAN), a wireless local area network (WLAN), a cellular communications network, and/or the like. In some embodiments, the network 106 can include a wired or a wireless network. In some embodiments, the network 106 can include a single network or a combination of networks.

A client device 104 may include any variety of electronic devices. In some embodiments, a client device 104 can include a device capable of communicating information via the network 106. A client device 104 may include one or more computer devices, such as a desktop computer, a server, a laptop computer, a tablet computer, a wearable computer device, a personal digital assistant (PDA), a smart phone, and/or the like. In some embodiments, a client device 104 may be a client of the application server 110. In some embodiments, a client device 104 can include various input/output (I/O) interfaces, such as a display (e.g., for displaying a graphical user interface (GUI)), an audible output user interface (e.g., a speaker), an audible input user interface (e.g., a microphone), an image acquisition interface (e.g., a camera), a keyboard, a pointer/selection device (e.g., a mouse, a trackball, a touchpad, a touchscreen, a gesture capture or detecting device, or a stylus), and/or the like. In some embodiments, a client device 104 can include general computing components and/or embedded systems optimized with specific components for performing specific tasks. In some embodiments, a client device 104 can include programs/applications that can be used to generate a request for content, to provide content, to render content, and/or to send and/or receive requests to and/or from other devices via the network 106. For example, a client device 104 may include an Internet browser application that facilitates communication with the application server 110 via the network 106. In some embodiments, a program, or application, of a client device 104 can include program modules having program instructions that are executable by a computer system to perform some or all of the functionality described herein with regard to at least the client devices 104. In some embodiments, a client device 104 can include one or more computer systems similar to that of the computer system 1000 described below with regard to at least FIG. 8.

The application server 110 may include a computing device having network connectivity and being capable of providing one or more services to network clients, such as a client device 104. These services may include ingesting, processing, storing, monitoring, and/or searching data. Although certain embodiments are described with regard to a single server for the purpose of illustration, embodiments may include employing multiple servers, such as a plurality of distributed servers. In some embodiments, the application server 110 can include one or more computer systems similar to that of the computer system 1000 described below with regard to at least FIG. 8.

The data store 158 may include a medium for the storage of data thereon. For example, the data store 158 may include a non-transitory computer-readable medium storing data thereon that is accessible by entities of the environment 100, such as the application server 110. In some embodiments, the data store 158 may store the index management module 150, the index settings 152, and/or the index definitions 154. Although certain embodiments are described with regard to a single data store 158 for the purpose of illustration, embodiments may include employing multiple data stores 158, such as a plurality of distributed data stores 158.

A data source (also referred to as a "source" or "data input") 112 may be a source of incoming source data (also referred to as "event data") 130 being fed into the system 102. A data source 112 may include one or more external data sources, such as web servers, application servers, databases, firewalls, routers, operating systems, and software applications that execute on computer systems, mobile devices, sensors, and/or the like. A data source 112 may be located remote from the system 102. For example, a data source 112 may be defined on an agent computer operating remote from the system 102, such as on-site at a customer's location, that transmits source data 130 to one or more forwarders 114 via a communications network (e.g., network 106). A data source 112 may be local to (e.g., integrated with) the system 102. For example, a data source 112 may be defined on a forwarder 114. In some embodiments, the data sources 112 can be the same or similar to the data sources 1105 described below with regard to at least FIG. 9. In some embodiments, a source 112 can include one or more computer systems similar to that of the computer system 1000 described below with regard to at least FIG. 8.

The source data 130 can be a stream or set of data fed to an entity of the system 102, such as a forwarder 114. The source data 130 may include, for example, raw time-series data, such as server log files, activity log files, configuration files, messages, network packet data, performance measurements, sensor measurements, and/or the like.

A forwarder 114 may be an entity of the system 102 that forwards data to another entity of the system, such as an indexer 116, another forwarder 114, or a third-party system. An entity that receives data from a forwarder 114, such as an indexer 116, may be referred to as a receiver entity. There can be different types of forwarders 114, such as universal forwarders heavy forwarder, and light forwarders\. A universal forwarder may not provide much, if any, processing of the data and, thus, may be used to forward unparsed data (e.g., forward the raw source data 130 to an indexer 116). A light forwarder may provide some processing of the data, such as data parsing and, thus, may be used to parse the raw data and forward the resulting parsed data to an indexer 116. A heavy forwarder may provide some processing of the data, such as data parsing, assessment of events identified by the parsing, and/or routing the resulting parsed data to particular forwarders 114 based on the contents of the identified events. In some embodiments, the forwarders 114 can be the same or similar to the forwarders 1101 described below with regard to at least FIG. 9. In some embodiments, a forwarder 114 can include one or more computer systems similar to that of the computer system 1000 described below with regard to at least FIG. 8.

An indexer 116 may be an entity of the system 102 that indexes data, transforming raw source data 130 into events and placing the results into an index 140. An indexer 116 may also search indexes 140 in response to search requests. An indexer 116 may perform other functions, such as data input and search management. In some instances, the forwarders 114 handle data input, and forward the source data 130 to the indexers 116 for indexing. An indexer 116 may perform searches across its own stored data (e.g., the data of indexes 140 stored in an index data store 118 managed by the indexer 116). In some instances, a search head 120 can handle search management and coordinate searches across multiple indexers 116. In some embodiments, the indexer 116 can be the same or similar to the indexers 1102 described below with regard to at least FIG. 9. In some embodiments, an indexer 116 can include one or more computer systems similar to that of the computer system 1000 described below with regard to at least FIG. 8.

An indexer 116 is sometimes referred to by more specific terms, according to its context. For example, a search peer may refer to an indexer 116 in a distributed search topology, and a peer node may refer to an indexer 116 in an indexer cluster. An indexer cluster may be a group of indexers 116 configured to replicate external data so that they maintain multiple copies of the data. Replication of the indexes 140 may improve data availability, data fidelity, disaster tolerance, and search performance. An indexer cluster node may be one of the entities (e.g., an indexer 116) that makes up an indexer cluster. Each indexer cluster may include the following: one master node, one or more peer nodes, and one or more search heads. The term "indexer cluster node" may refer to the master node and the peer nodes, but a search head 120 can also be considered a type of cluster node. A single-site indexer cluster may be an indexer cluster in which all nodes reside on a single physical site. A multisite indexer cluster may be an indexer cluster that spans multiple physical sites, such as different data centers that are remote from one another. Each site may have its own set of peer nodes and search heads 120. Each site may also obey site-specific replication and search factor rules.

An index data store 118 may include a medium for the storage of data thereon. For example, a data store 118 may include a non-transitory computer-readable medium storing data thereon that is accessible by entities of the environment 100, such as the corresponding indexer 116. The data may include, for example, one or more indexes 140 including one or more buckets 142, and the buckets 142 may include an index file 144 and/or a raw data file 146 (e.g., including parsed, time-stamped events). In some embodiments, each data store 118 is managed by a given indexer 116 that stores data to the data store 118 and/or performs searches of the data stored on the data store 118. Although certain embodiments are described with regard to a single data store 118 for the purpose of illustration, embodiments may include employing multiple data stores 118, such as a plurality of distributed data stores 118. In some embodiments, an index data store 118 is the same or similar to the data stores 1103 described below with regard to at least FIG. 9.

A search head 120 may be an entity of the system 102 that handles search requests and/or consolidates the search results for presentation to a user. In a distributed search environment (e.g., including multiple indexers 116), a search head 120 may distribute search requests across a set of indexers 116 that perform the actual searching to generate individual sets of search results, and then merge the individual sets of search results into a consolidated set of search results that are provided to the user. In a non-distributed search environment (e.g., including only a single indexer 116), the indexer 116 may assume the role of a search head 120 and may handle the search management, as well as the indexing and searching functions. An entity of the system 102 may function as both a search head 120 and a search peer. If an entity does only searching (and not any indexing), it is usually referred to as a dedicated search head. A search head cluster may be a group of search heads 120 that serve as a central resource for searching. The search heads 120 in a search head cluster may be interchangeable. Thus, for example, the same searches, dashboards, knowledge objects, and so on may be run or accessed from any member of the cluster. To achieve this interchangeability, the search heads 120 in the cluster may share configurations, applications, search artifacts, and job loads. In some embodiments, a search head 120 is the same or similar to the search head 1104 described below with regard to at least FIG. 9. In some embodiments, the search head 120 can include one or more computer systems similar to that of the computer system 1000 described below with regard to at least FIG. 8.

The process of indexing data may be part of a larger sequence of processing data. In some embodiments, a "data pipeline" refers to a route that data takes through an event-processing system 102, from its origin in sources, such as log files and network feeds, to its transformation into searchable events that encapsulate valuable knowledge. Such a data pipeline may include, for example, an input segment, a parsing segment, an indexing segment, and a search segment. Each segment may be conducted by one or more entities of the system 102, such as one or more forwarders 114, one or more indexers 116, and/or one or more search heads 120 of system 102.

During the input segment (e.g., the first segment of the data pipeline), system 102 may acquire a raw data stream (e.g., source data 130) from its source (e.g., a source 112), break it into blocks (e.g., 64K blocks of data), and/or annotate each block with metadata keys. After the data has been input, it may be moved to the next segment of the pipeline (parsing). The data input segment may be conducted, for example, by a forwarder 114 and/or an indexer 116 of system 102. In some instances, a parsing queue in the data pipeline holds data after it enters the system but before parsing (a first phase of the event processing) occurs. Thus, incoming data may first go to the parsing queue and from there to the parsing segment.

During the parsing segment (e.g., the second segment of the data pipeline), system 102 may conduct parsing, a first stage of the event processing of the raw data (e.g., source data 130). This can include, for example, extracting a set of default fields for each event, including host, source and source type, configuring character set encoding, identifying line termination using line breaking rules, identifying event boundaries, identifying event timestamps (or creating them if they don't exist), masking sensitive event data (such as credit card or social security numbers), applying custom metadata to incoming events, and/or the like. Accordingly, during this first stage of event processing, the raw data may be data broken into individual events, and the parsed data may be moved to the next segment of the pipeline (indexing). The parsing segment may be conducted, for example, by a heavy forwarder 114 and/or an indexer 116 of system 102.

During the indexing segment (e.g., the third segment of the data pipeline), system 102 may perform indexing of the parsed data, a second stage of the event processing. This can include, for example, breaking all events into segments that can then be searched upon, building the index data structures, and writing the raw data and index files to disk, where post-indexing compression occurs. Accordingly, during the second stage of the event processing, the parsed data (also referred to as "events") may be written to a search index on disk (e.g., written to an index 140 in an index data store 118). The indexing segment may be conducted, for example, by an indexer 116 of system 102. In some embodiments, both parsing and indexing can take place on the same indexer 116. In some embodiments, an index queue in the data pipeline holds parsed events waiting to be indexed. Thus, incoming data may go from the parsing queue to the parsing segment of the pipeline where it undergoes parsing, and the processed data may move to the index queue and ultimately on to the indexing segment, where the index is built.

During the searching segment (e.g., the fourth segment of the data pipeline), system 102 may conduct searches of the indexed data to identify and access data that is responsive to search queries. This can include, for example, identifying stored events in a raw data that are responsive to user specified search criteria. For example, if indexed data is stored in a data store 118 of an indexer 116, and the indexer 116 is assigned a search task by the search head 120, then the indexer 116 may search the data store 118 for data responsive to the search and send any responsive data back to the search head 120. The search head 120 may send similar search tasks to other indexers 116, consolidate the responsive data received from the indexers 116, and provide the consolidated search results (e.g., to a client device 104 for display to a user).

In some embodiments, the management of indexes 140 is employed based on one or more user-specified index settings 152, such as index names, index maximum sizes, index retention policies, index access policies, and/or the like. In some embodiments, an index name specifies the name of an index 140, and it can be used when referring to the index 140. For example, the user 108 may request to create an index named "Server_Data" the index 140 may be created by the system 102, and the user 108 may be able to refer to the index 140 by name during future processing operations. For example, the user 108 may specify that data from a given source 112 is to be deposited into the index 140 named "Server_Data," the user 108 may specify that a search is to be performed on the data in the index 140 named "Server_Data," the user 108 may request to generate a report on the data in the index 140 named "Server_Data," the user 108 may request to edit one or more index settings for the index named "Server_Data," and/or the like.

A maximum size for an index 140 may specify the maximum amount of data that can be stored in the index 140. In some instances, if data is added to the index 140 and the resulting size of the index 140 exceeds the maximum size, then at least some data may be removed from the index 140. For example, if the user 108 specifies a maximum size of 500,000 gigabytes (GB) for the index 140, the index 140 initially contains 495,000 GB of data, and 10,000 GB of new data is added to the index, then 5,000 GB of data may be removed from the index 140 as a result of adding the 10,000 GB of new data. In some embodiments, the oldest data is removed first. Thus, for example, if the 10,000 GB of new data is to be added to the index 140, then the oldest 5,000 GB of data in the index 140 may be removed from the index 140. In some embodiments, removing data from the index 140 can include deleting the data from the index 140 (e.g., deleting the raw data from the raw data file 146 and removing any references to the removed data from the index file 144) and/or archiving the data deleted from the index 140 (e.g., storing the data deleted from the raw data file 146 in an archive so that it can be accessed later if needed).

A retention policy for an index 140 may specify how long data can reside in an index 140 before being removed from the index. A retention policy for an index 140 may specify, for example, that data should be removed from the index 140 if it is older than a threshold age. For example, if a retention policy specifies a retention period of 90 days (e.g., a "time to live" of 90 days), then the data in the index that is more than 90 days old may be removed from the index 140. A retention policy for an index may also specify how data is rolled from one bucket to another. For example, a retention policy may specify that data is stored in a hot data bucket and the data of the hot bucket is rolled into a warm bucket when the data in the hot bucket reaches a specified size and/or the data reaches a specified first age, the data of the warm bucket is rolled into a cold bucket when the data in the warm bucket reaches a specified size and/or the data reaches a specified third age, and the data of the cold bucket is rolled into a frozen bucket when the data in the cold bucket reaches a specified size and/or the data reaches a specified fourth age, and, finally, the data of the frozen bucket is removed (e.g., deleted or archived) when the data in the frozen bucket reaches a specified size and/or the data reaches a specified fifth age.

An access policy for an index 140 may specify who or what entities can access the index 140. An access policy for an index may specify, for example, one or more users (or groups of users) that have permission to access the index 140 and/or one or more users (or groups of users) that do not have permission to access an index 140. For example, if an index access policy grants access to users with "level 3" or greater credentials, then users with "level 3" or "level 4" credentials may be able to access the index 140 (e.g., search the index 140 or edit the index settings for the index 140), whereas users with "level 1" and "level 2" credentials may not be allowed to access the index 140.

In some embodiments, index settings can be configured by a user 108 via an interactive interface (e.g., via an interactive index management GUI). For example, the user 108 may use a data monitoring application of the client device 104 to log into or otherwise access his/her account via the application server 110. Once logged in, the user 108 may gain access to various portions of the system 102, such as the data searching and the data reporting features. The data searching feature may, for example, enable the user 108 to search indexed data stored in the one or more indexes 140 associated with the user's account. The data reporting feature may, for example, enable the user 108 to access or generate reports using indexed data stored in the one or more indexes 140 associated with the user's account. In some embodiments, the user 108 may also have the ability to view and configure various settings relating to his/her account. For example, the user 108 may be able to review a listing of existing indexes 140; review properties of the existing indexes 140; and configure user preferences, index search preferences, user configurable index settings, and/or the like.

In the context of user configurable index settings, the user 108 may be able to specify index settings relating to how his/her data is indexed including, for example, specifying which indexes 140 are to be created, and defining settings for the indexes 140, such as index names, maximum sizes, retention policies, access policies, and/or the like. Example GUIs of an interactive index management GUI are described in more detail below with regard to at least FIGS. 3-7G.

In some embodiments, user specified index settings 152 can be distributed to one or more entities of the system 102 for use in creating, managing, and using the indexes 140. For example, upon receiving one or more index settings 152 (e.g., via an interactive index management GUI), the index management module 150 may generate a corresponding index configuration file (e.g., an "indexes.conf" file) including an index definition 154 that specifies one or more indexes 140 to be employed by the system 102 and the characteristics thereof that correspond to the user specified index settings 152. The configuration file may include an index definition 154 that specifies, for example, a name, a maximum size, a retention policy, an access policy, and/or the like for each of one or more indexes 140. Continuing with the above example, the index definition 154 in the configuration file may define a first index having a name of "Server_Data," a maximum size of 500,000 gigabytes (GB), a retention period of 90 days (e.g., a "time to live" of 90 days), and an access permission of "level 3."

In some embodiments, the index management module 150 may identify entities of the system 102 that rely on the index definition 154 as interested entities of the system 102, and the index management module 150 may automatically distribute the index configuration file to the interested entities of the system 102. For example, the index management module 150 may push (or otherwise distribute) the index configuration file to interested entities of the system 102, such as the indexers 116 and the search heads 120 of the system 102. In some embodiments, the interested entities may be a subset of the indexers 116 and the search heads 120. For example, the index management module 150 may push (or otherwise distribute) the index configuration file to the indexers 116 and the search heads 120 tasked with generating an index 140 specified by the index definition 154, and the search heads 120 that can initiate searches of the indexes specified by the index definition 154. In some embodiments, the index definition 154 may be distributed in a hierarchical manner. For example, the index management module 150 may identify one or more indexer clusters that will create and manage the indexes 140 defined in the index definition 154, the index management module 150 may push (or otherwise distribute) the index configuration file to a master node of the one or more indexer clusters, and the master node may be responsible for distributing the configuration file to the other nodes of the cluster, such as the peer nodes and the search heads 120 of the cluster. In some embodiments, some or all of the entities that receive the configuration file may store the configuration file (including the index definition 154) locally, and use the index settings of the index definition 154 to create and manage the respective indexes 140 of the system 102.

In some embodiments, a search head 120 can use an index definition 154 during a search operation. For example, if an index configuration file is stored locally on a search head 120, and a user 108 engages in defining a search via a search GUI having a field for specifying one or more indexes 140 to be searched, then the search head 120 may assess the index definition 154 to determine the names of one or more indexes 140 that exist (e.g., based on the indexes 140 being defined in the index definition 154) including, for example, the name "Server_Data" defined in the index definition 154. The search head 120 may provide a list of the names of the one or more indexes 140 for display via the search GUI. Thus, the user 108 may be provided with an indication of the indexes 140 that can be searched. In some embodiments, the determined index names can be used to provide auto completion of the field of the search GUI for specifying one or more indexes 140 to be searched. For example, in response to determining that the user 108 has entered a string that starts with the letter "s" in the field of the search GUI for specifying one or more indexes 140, the search head 120 may auto populate the field with names of indexes 140 that begin with the letter "s" including the index name "Server_Data."

In some embodiments, an indexer 116 can use an index definition 154 for managing creation of the indexes 140. For example, an indexer 116 may access the index definition 154 of the index configuration file, determine that the index definition 154 defines a "Server_Data" index 140, determine that the "Server_Data" index 140 does not exist, and create the "Server_Data" index 140.

In some embodiments, an indexer 116 can use an index definition 154 for managing removal of the indexes 140. For example, an indexer 116 may access the index definition 154 of the index configuration file, determine that the index definition 154 does not define a "Server_Data" index 140, determine that the "Server_Data" index 140 currently exists, and remove the "Server_Data" index 140.

In some embodiments, an indexer 116 can use an index definition 154 for managing data retention for an index 140. For example, an indexer 116 may access the index definition 154 of the index configuration file, determine that the index definition 154 for the "Server_Data" index 140 specifies a 90-day retention policy, and remove data that is more than 90 days old from the "Server_Data" index 140.

In some embodiments, an indexer 116 can use an index definition 154 for managing access to an index 140. For example, an indexer 116 may access the index definition 154 of the index configuration file, determine that the index definition 154 for the "Server_Data" index 140 specifies a "level 3" access policy, and prohibit users 108 (or other entities, such as client devices 104) with less than "level 3" permissions from accessing the "Server_Data" index 140 and/or allow users (or other entities, such as client devices 104) with "level 3" or greater permissions to access the "Server_Data" index 140.

Figure 2:
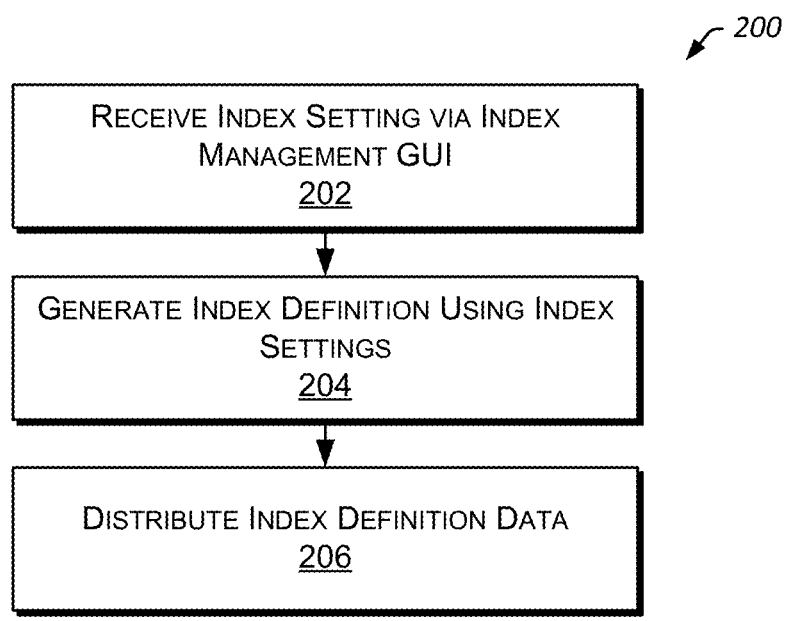
FIG. 2 is a flowchart that illustrates an example method for managing data indexes in accordance with the disclosed embodiments.

FIG. 2 is a flowchart that illustrates an example method 200 for managing indexes in accordance with the disclosed embodiments. Method 200 can generally include receiving index settings via an index management GUI (block 202), generating an index definition using the index settings (block 204), and distributing the index definition (block 206). Some or all of the elements of the method 200 may be performed, for example, by the index management module 150.

In some embodiments, receiving index settings via an index management GUI (block 202) can include receiving index settings 152 submitted by the user 108 via an index management GUI. For example, the user 108 may log into his/her account via a client device 104 and submit a request to access an index management GUI (e.g., selecting a link to an index management content page). The index management module 150 may serve, to the client device 104, corresponding index management GUI content 156 that is rendered by the client device 104 for display to the user 108. The user 108 may navigate through, and interact with, various interactive index management GUIs to manage (e.g., create, read, edit, or delete) one or more indexes 140 of the system 102. For example, the user 108 may review a listing of existing indexes 140 using an index management GUI (e.g., as discussed herein with regard to at least FIGS. 4A and 4B), edit settings for existing indexes 140, delete existing indexes 140, clean existing indexes 140 and/or the like using one or more index editing GUIs (e.g., as discussed herein with regard to at least the GUIs of FIGS. 5A-5I), create new indexes 140 using one or more index creation GUIs (e.g., as discussed herein with regard to at least the GUIs of FIGS. 6A-6C), and/or the like. Embodiments of employing such GUIs are further described with regard to at least FIGS. 7A-7G.

In some embodiments, generating an index definition using the index settings (block 204) can include generating an index definition 154 using some or all of the user specified index settings 152, and/or one or more other index settings 152 provided from other sources. For example, upon receiving the index settings 152 defining a first index having a name of "Server_Data," a maximum size of 500,000 gigabytes (GB), a retention period of 90 days (e.g., a "time to live" of 90 days), and a permission of "level 3," the index management module 150 may generate an index configuration file (e.g., an "indexes.conf" file) that includes an index definition 154 that defines at least a first index having a name of "Server_Data," a maximum size of 500,000 gigabytes (GB), a retention policy of 90 days (e.g., a "time to live" of 90 days), and an access policy of "level 3." In some embodiments, a copy of the index definition 154 may be stored locally in data store 158.

In some embodiments, distributing the index definition (block 206) can include distributing the index definition 154 to one or more entities of the system 102. For example, the index management module 150 may distribute the index configuration file (e.g., the "indexes.conf" file) that includes the index definition 154 to some or all of the indexers 116 and/or the search heads 120 of the system 102. In some embodiments, the index management module 150 may identify entities of the system 102 that rely on the index definition 154 as interested entities of the system 102, and the index management module 150 may automatically distribute the index definition 154 to the interested entities of the system 102. For example, the index management module 150 may push (or otherwise distribute) the index configuration file to interested entities of the system 102, such as the indexers 116 and the search heads 120 of the system 102. In some embodiments, the interested entities may be a subset of the indexers 116 and the search heads 120. For example, the index management module 150 may push (or otherwise distribute) the index configuration file to the indexers 116 and the search heads 120 tasked with generating an index 140 specified by the index definition 154, and the search heads 120 can initiate searches of the indexes 140 specified by the index definition 154. In some embodiments, the index definition 154 may be distributed in a hierarchical manner.

For example, the index management module 150 may identify one or more indexer clusters that will create and manage the indexes 140 defined in the index definition 154, the index management module 150 may push (or otherwise distribute) the index configuration file to a master node of the one or more indexer clusters, and the master node may be responsible for distributing the configuration file to the other nodes of the cluster, such as the peer nodes and the search heads 120 of the cluster. In some embodiments, some or all of the entities that receive the configuration file may store the configuration file (including the index definition 154) locally, and use the index settings of the index definition 154 to create and manage the respective indexes 140 of the system 102.

FIGS. 3-6C illustrate example GUIs of an interactive index management GUI in accordance with the disclosed embodiments. FIGS. 7A-7G illustrate an example method 700 of employing the example GUIs of the interactive index management GUI in accordance with the disclosed embodiments. In some embodiments, display of the described GUIs can be caused or otherwise provided by the index management module 150. For example, the index management module 150 may serve, to the client device 104, corresponding index management GUI content 156 that is rendered by the client device 104 for display to the user 108. The user 108 may interact with the displayed GUI to provide inputs (e.g., index settings 152 and/or the like) that are transmitted to the index management module 150. The user 108 may navigate through, and interact with, various interactive index management GUIs to manage (e.g., create, read, edit, or delete) one or more indexes 140 of the system 102.

Figure 3:
FIGS. 3-6C illustrate example graphical user interfaces (GUIs) of an interactive index management GUI in accordance with the disclosed embodiments.
Figure 4A:
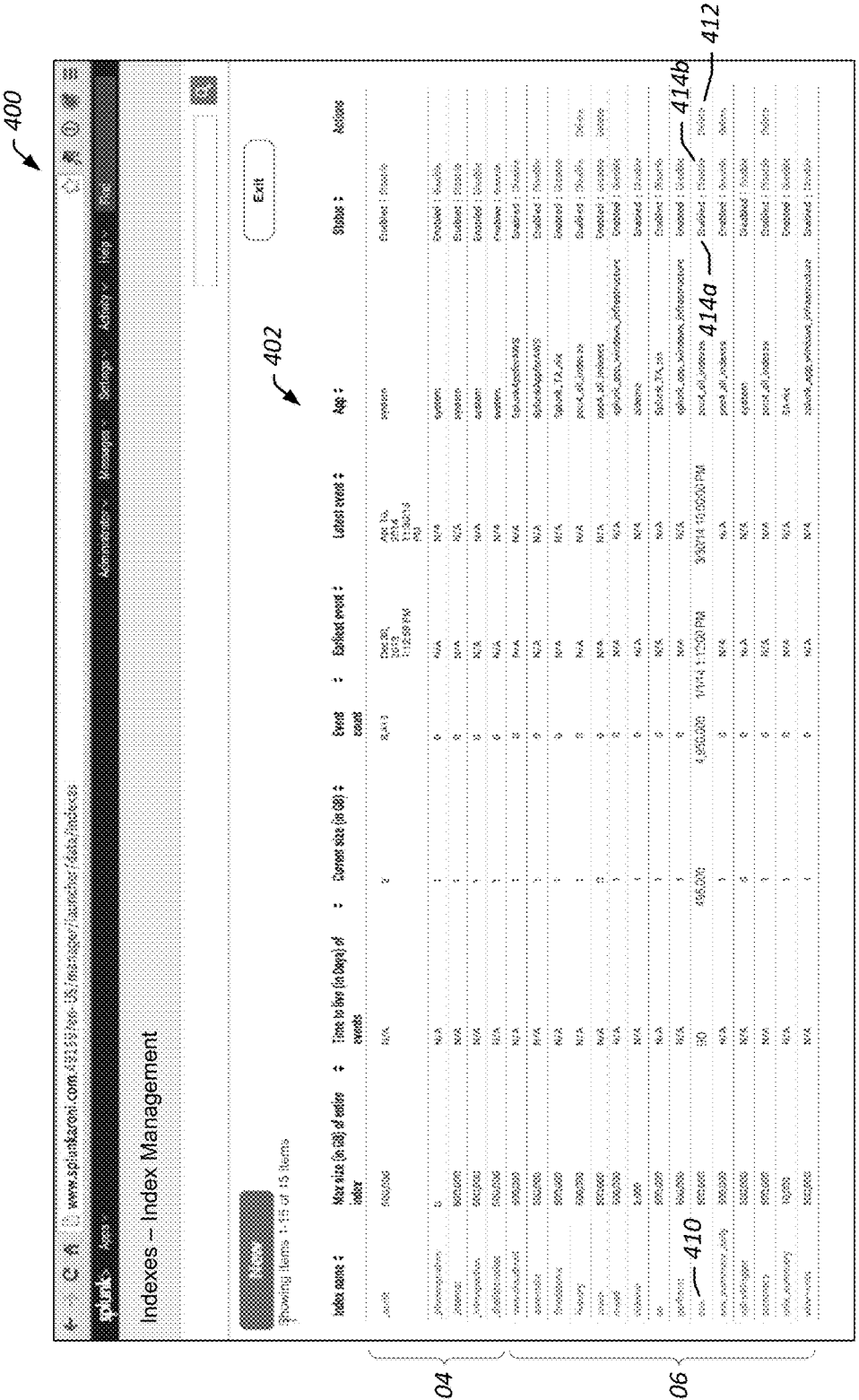
Figure 4B:
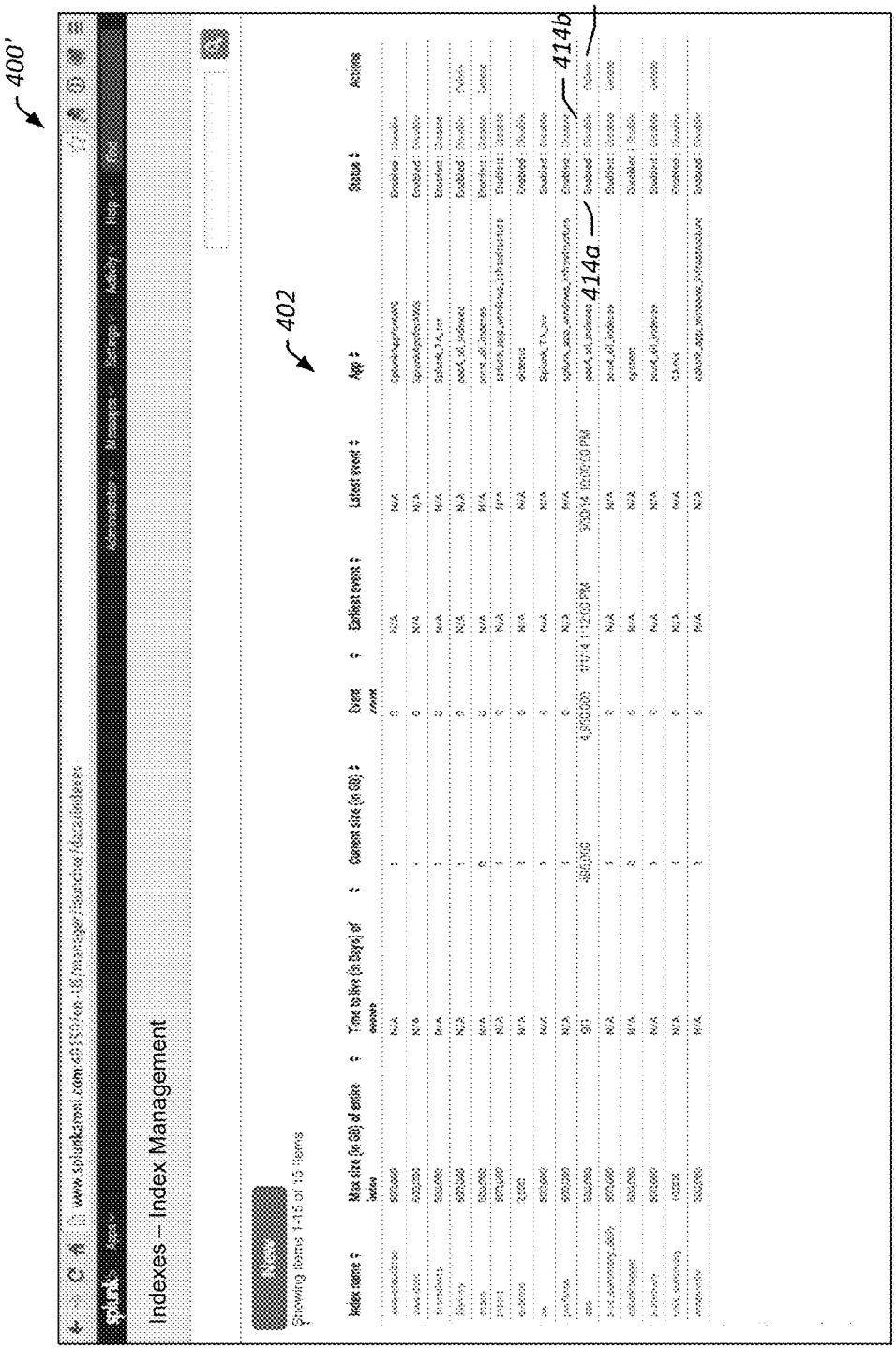
Figure 7A:
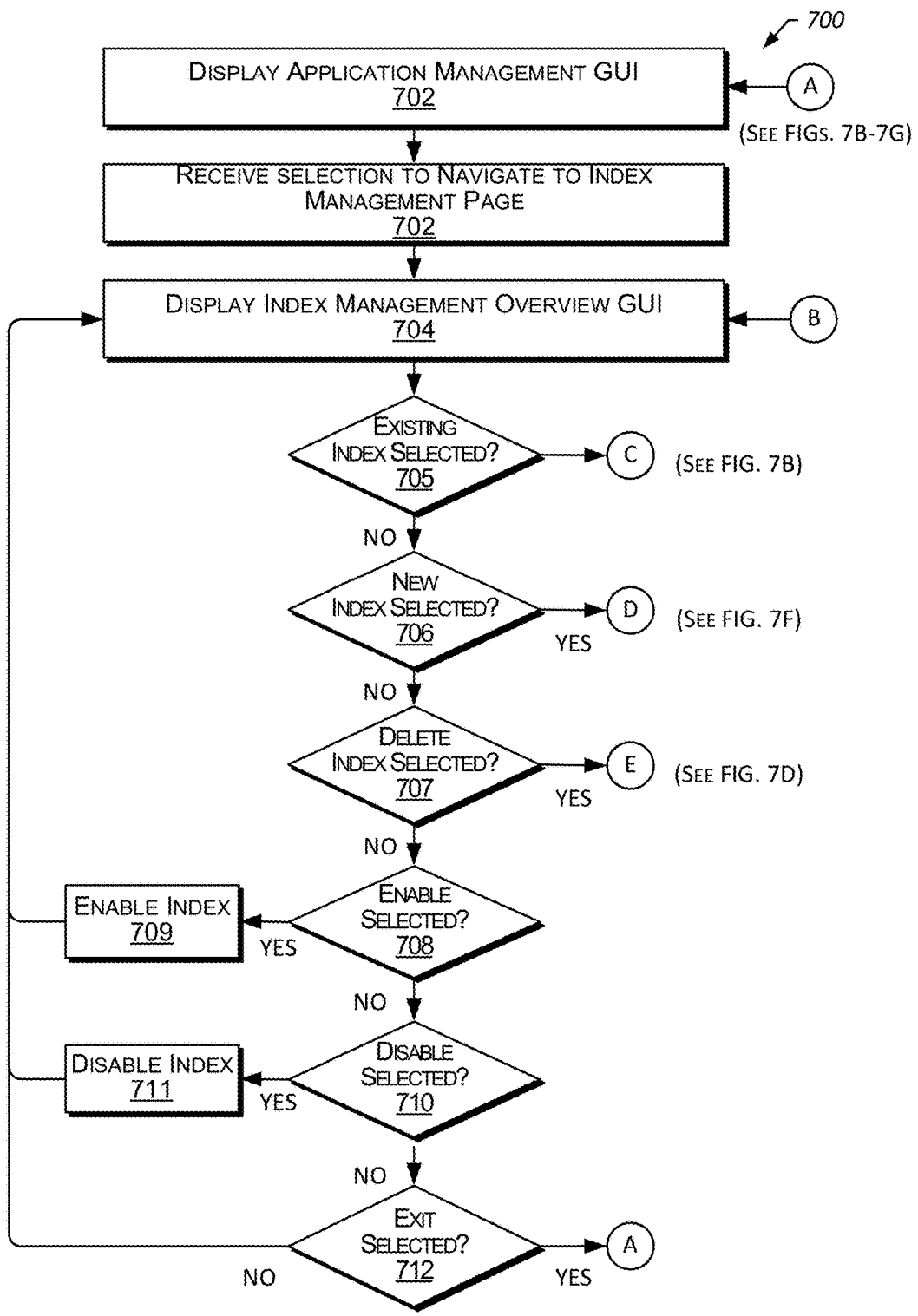
FIGS. 7A-7G are flowcharts that illustrate example methods of employing the example graphical user interfaces of the interactive index management GUI described with respect to FIGS. 3-6C, in accordance with the disclosed embodiments.

Referring to FIG. 7A, in some embodiments, an application management home page GUI may be displayed (block 702). FIG. 3 illustrates an example application management home page GUI 300 in accordance with the disclosed embodiments. In some embodiments, the application management home page GUI 300 may be displayed, for example, as a result of the user 108 logging into his/her account with the system 102. In some embodiments, the application management home page GUI 300 includes a menu selection for "Settings" that, when selected, provides a drop-down menu displaying links to various destinations. The links may include an "Indexes" link 302. Upon selection of the indexes link 302 (block 703), an index management overview GUI may be displayed (block 704). FIG. 4A illustrates an example index management overview GUI 400 in accordance with the disclosed embodiments. As illustrated, the index management overview GUI 400 may include a table of indexes 402. Each row of the table of indexes 402 may correspond to an existing index 140. In some embodiments, the table of indexes 402 may list all of the existing indexes, including internal and external indexes 140. For example, as depicted in FIG. 4A, the table of indexes 402 may include a listing of internal indexes 404 (e.g., "_audit," "_blocksignature," and the like that are intended for internal use only, such as by system administrators) and a listing of external indexes 406 (e.g., "aws-cloudtrail," "aws-data," and the like that are intended for use by customers). In some embodiments, the table of indexes 402 may list a subset of the existing indexes, including, for example, only external indexes 140 and hiding internal indexes 140. For example, as depicted in FIG. 4B, in an alternate view of the index management overview GUI 400, the table of indexes 402 may include a listing of external indexes 406 (e.g., showing rows for "aws-cloudtrail," "aws-data," and the like), but may hide internal indexes (e.g., not showing rows for "_audit," "_blocksignature," and the like).

As illustrated, in some embodiments, each row of the table of indexes 402 may include a column for each of an index name, an index maximum size, an index retention policy (e.g., "Time to live (in Days) of events), a current size, an event count, an earliest event, a latest event, an application ("app"), a status, and available actions ("actions"). The index name may indicate the name assigned to the index (e.g., "sos"). In some embodiments, the displayed name of an index may include a link to an index editing interface. The index maximum size may indicate the current maximum size specified for the index 140 (e.g., 500,000 gigabytes (GB)). The index retention policy may indicate the current retention policy for the index 140 (e.g., a "time to live" of 90 days). The current size may correspond to the amount of data currently stored in the index 140 (e.g., 495,000 GB). The event count may indicate the number of events for which data is currently stored in the index 140 (e.g., 4.95M). The earliest event may indicate the date and time of the earliest (or oldest) event for which data is currently stored in the index 140 (e.g., Jan. 1, 2014; 1:12:00 PM). The latest event may indicate the date and time of the latest (or newest) event for which data is currently stored in the index 140 (e.g., Mar. 30, 2014; 10:00:00 PM). The application may indicate an application associated with the index 140. The status may indicate whether the index 140 is currently enabled or disabled. In some embodiments, the status may include an enable and/or disable link, and clicking on the enable or disable link may result in performing a respective enabling or disabling of the index 140. The actions may indicate actions currently available for the index 140 (e.g., delete the index 140) from the index management overview GUI 400. In some embodiments, the index management overview GUI 400 may include an indication of allocated storage, such as that described U.S. patent application Ser. No. 14/610,777, titled "SYSTEMS AND METHODS FOR MANAGING STORAGE OF MACHINE DATA" and filed on Jan. 30, 2015, which is hereby incorporated by reference.

If the name of an existing index is selected (block 705), then an index editing GUI may be displayed (block 720 of FIG. 7B, described below). For example, if the name of the existing index "sos" 410 is selected (block 705), then an index editing GUI for the "sos" index may be displayed.

In some embodiments, the index management overview GUI 400 can include a "New" button that provides for navigation to an interface for creating a new index 140. If the "New" button is selected (block 706), then an index creation GUI may be displayed (block 780 of FIG. 7F, described below).

If a delete link is selected (block 707), then a delete index warning GUI may be displayed (block 740 of FIG. 7D, described below). For example, if the delete link 412 for the "sos" index is selected, then the interactive index management GUI may navigate to display a delete index warning GUI for the "sos" index.

If an enable index link is selected (block 708), then the index 140 may be enabled (block 709). For example, if the enable index link 414a is selected for the "sos" index 140, the "sos" index 140 may be enabled such that additional data can be written to the index 140, and the index management overview GUI 400 may continue to be displayed (block 704). If a disable index link is selected (block 710), then the index 140 may be disabled (block 711). For example, if the disable index link 414b is selected for the "sos" index 140, the "sos" index 140 may be disabled such that additional data cannot be written to the index 140, and the index management overview GUI 400 may continue to be displayed (block 704).

In some embodiments, the index management overview GUI 400 can include an "Exit" button. If the "Exit" button is selected (block 712), then the application management home page GUI 300 (of FIG. 3) may be displayed (block 702). If no selections are made while the index management overview GUI 400 is displayed, the index management overview GUI 400 may continue to be displayed (block 704).

Figure 5A:
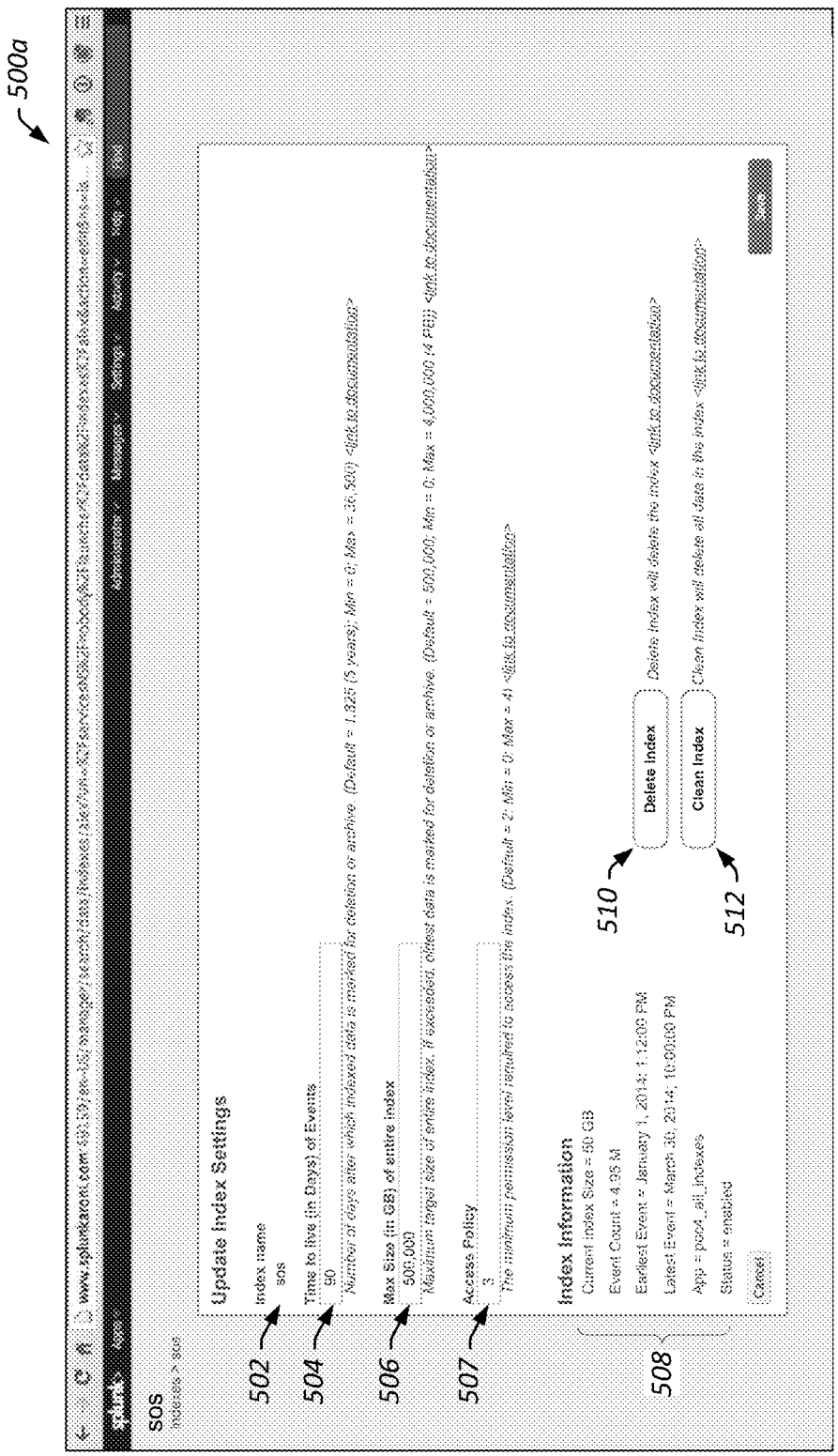
Figure 7B:
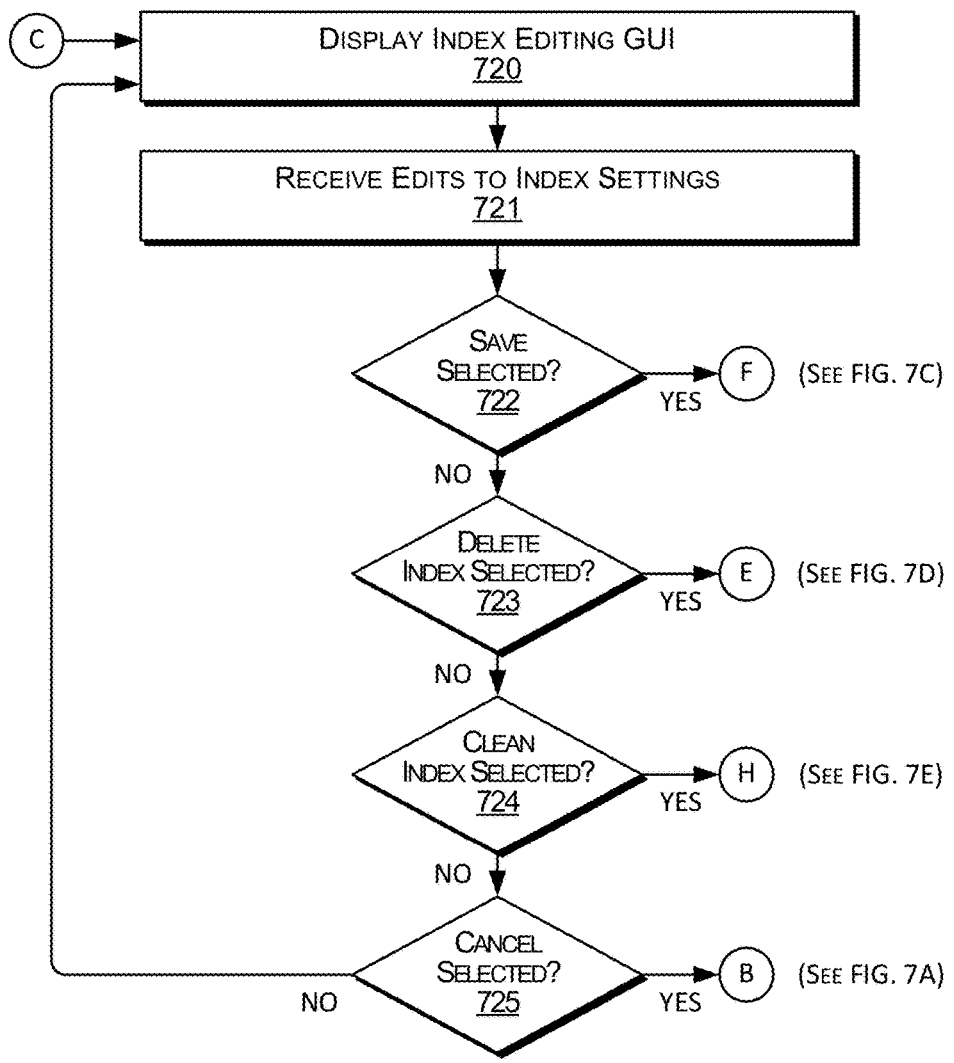

Referring to FIG. 7B, in some embodiments, an index editing GUI may be displayed (block 720). In some embodiments, the index editing GUI may enable a user to configure one or more index settings for a selected index 140. FIG. 5A illustrates an example index editing GUI 500a in accordance with the disclosed embodiments. As illustrated, the index editing GUI 500a may include a name field 502, a retention policy field (Time to live (in Days) of Events) 504, a maximum size field 506, an access policy field 507, and index information 508. The name field 502 may indicate the name of the index 140. For example, continuing with the above example, the name field 502 may include the name "sos" for the selected index 140. In some embodiments, the name field 502 for an existing index 140 may not be editable.

The retention policy field 504 may include a field that indicates a retention policy for the index 140. For example, in the illustrated embodiment, the retention policy field 504 indicates a current retention policy of 90 days. In some embodiments, the retention policy field 504 may be accompanied by a description of the field (e.g., "Number of days after which indexed data is marked for deletion or archive"), default values (e.g., "Default=1,825 (5 years)"), maximum and minimum values (e.g., "Min=0; Max=36,500") and/or a link to relevant documentation (e.g., a navigable link to documentation explaining how retention policies work and how they should be specified).

The maximum size field 506 may include a field that indicates a maximum size of the index 140. For example, in the illustrated embodiment, the maximum size field 506 indicates a maximum size of 500,000 GB. In some embodiments, the maximum size field 506 may be accompanied by a description of the field (e.g., "Maximum target size of entire index. If exceeded, oldest data is marked for deletion or archive"), default values (e.g., "Default=500,000"), maximum and minimum values (e.g., "Min=0; Max=4,000,000 (4 PB)"), and/or a link to relevant documentation (e.g., a navigable link to documentation explaining how maximum index sizes work and how they should be specified).

The access policy field 507 may include a field that indicates the minimum permission level required to access the index 140. For example, in the illustrated embodiment, the access policy field 507 indicates a current access policy of level "3". In some embodiments, the access policy field 507 may be accompanied by a description of the field (e.g., "The minimum permission level required to access the index"), default values (e.g., "Default=2"), maximum and minimum values (e.g., "Min=0; Max=4"), and/or a link to relevant documentation (e.g., a navigable link to documentation explaining how access policies work and how they should be specified).

The index information 508 may include current information about the index 140, such as the current size of the index (e.g., 495,000 GB), the event count for the index (e.g., 4.95 M events), the date and time of the earliest event in the index 140 (e.g., Jan. 1, 2014; 1:12:00 PM), the date and time of the latest event in the index 140 (e.g., Mar. 30, 2014; 10:00:00 PM), the application associated with the index 140 (e.g., poc4_all_indexes), and the status of the index 140 (e.g., enabled).

The index editing GUI 500a may include a "Delete index" button 510. Selection of the delete index button 510 may initiate deletion of the index 140. In some embodiments, the "Delete index" button 510 may be accompanied by a description of the operation of the button (e.g., "Delete Index will delete the index") and/or a link to relevant documentation (e.g., a navigable link to documentation explaining deletion of an index).

The index editing GUI 500a may include a "Clean index" button 512. Selection of the clean index button 512 may initiate cleaning the index 140 (e.g., deleting data in the index 140). In some embodiments, the "Clean index" button 512 may be accompanied by a description of the operation of the button (e.g., "Clean Index will delete all data in the index") and/or a link to relevant documentation (e.g., a navigable link to documentation explaining cleaning of an index).

The index editing GUI 500a may include a "Save" button. Selection of the "Save" button may initiate a process to save and apply the currently selected index settings. If, for example, the user 108 edits the index settings (block 721) and selects the "Save" button (block 722), then the index may be updated (block 730 of FIG. 7C, described below) and/or an index update progress GUI may be displayed (block 731 of FIG. 7C, described below). For example, if a user 108 has changed the value in the retention policy field 504 from 90 (days) to 50 (days), and changed the value in the maximum size field 506 from 500,000 (GB) to 400,000 (GB), when the user selects the "Save" button the index settings 152 (e.g., including the settings listed in the retention policy field 504, the maximum size field 506, and/or the access policy field 507) may be transmitted to the index management module 150, and the index management module 150 may initiate a process to apply the index settings 152 (e.g., generating and distributing a corresponding index definition 154 and distributing an index configuration file including the index definition 154). Thus, a process to apply the user selected index setting values may not be initiated until the "Save" button is selected.

If the "Delete index" button 510 is selected (block 723), then a delete index warning GUI may be displayed (block 740 of FIG. 7D, described below).

If the "Clean index" button 512 is selected (block 724), then a clean index warning GUI may be displayed (block 760 of FIG. 7E, described below).

The index editing GUI 500a may include a "Cancel" button. Selection of the "Cancel" button may cancel the index editing process, resulting in display of the index management overview GUI 400 (block 704 of FIG. 7A).

Figure 7C:
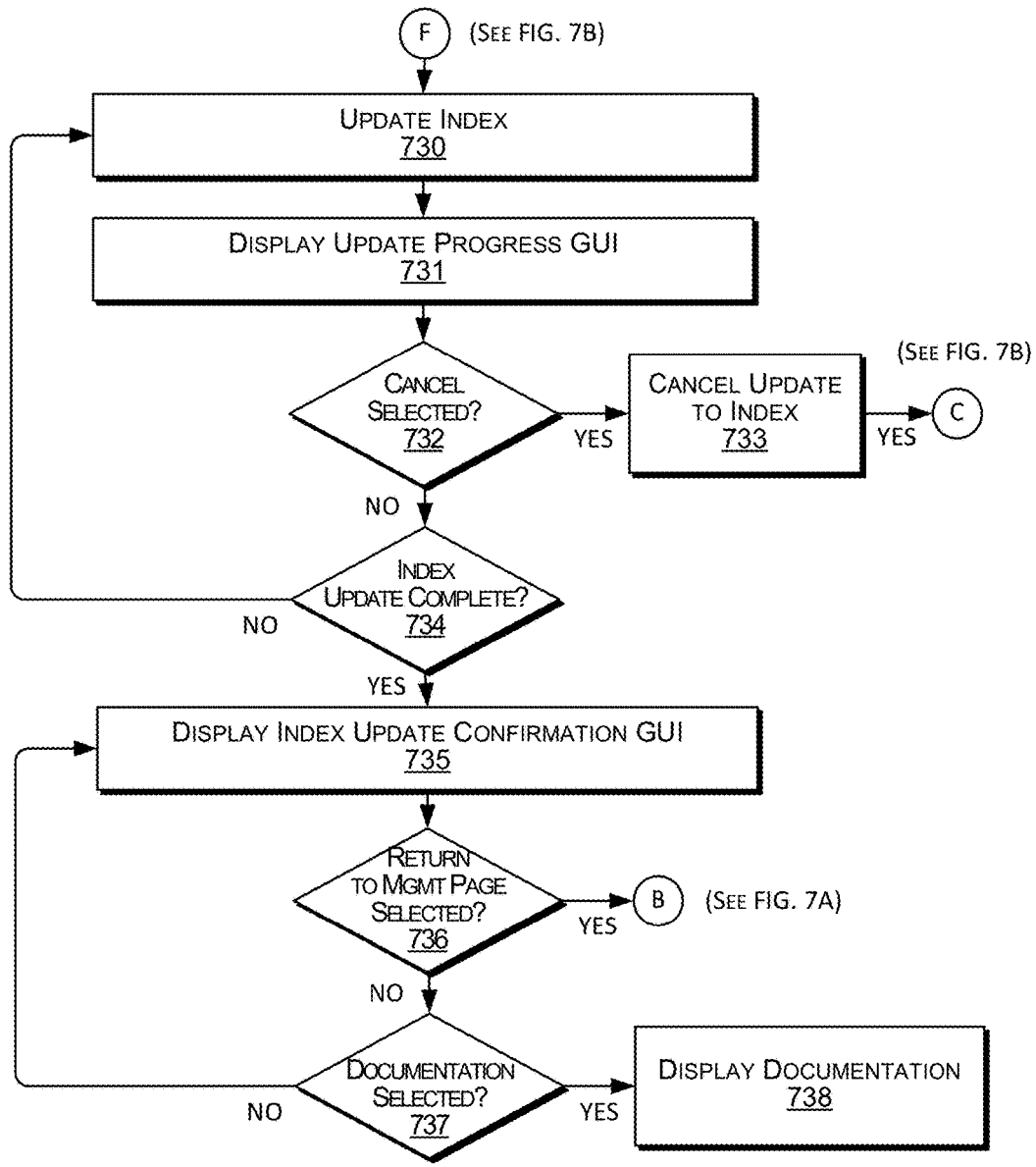

Referring to FIG. 7C, in some embodiments, updating of the index 140 may be conducted (block 730), and the interactive index management GUI may display an index updating GUI (block 731). In some embodiments, updating the index 140 may include generating an index configuration file using the submitted set of index settings 152 (e.g., including an index definition 154 defining the index 140 and the associated index settings listed in the retention policy field 504, the maximum size field 506, and/or the access policy field 507), and distributing the index configuration file to one or more entities of the system 102, such as some or all of the indexers 116 and/or the search head 120 as described herein.

Figure 5B:
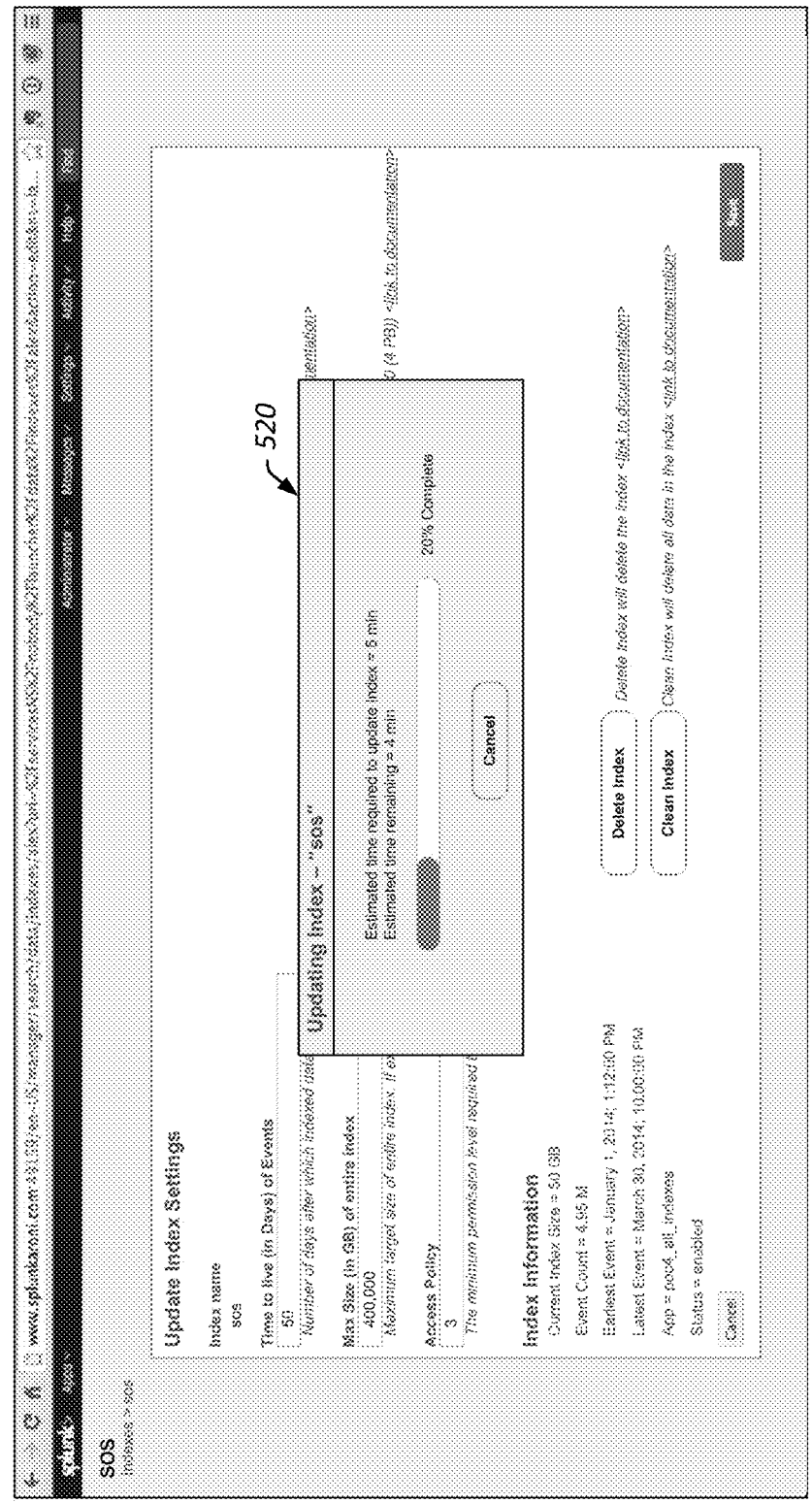

In some embodiments, while the updating of the index 140 is being conducted, an index update progress GUI may be displayed (block 731). The index update progress GUI may provide information relating to the status of the application of requested updates to the index 140 (e.g., including generation of the index configuration file and distribution of the index configuration file to the entities of the system 102). FIG. 5B illustrates an example index update progress GUI 500b in accordance with the disclosed embodiments. The index update progress GUI 500b may include a dialogue box 520 displaying update progress information that can, for example, indicate an estimated time required to update the index (e.g., "Estimated time required to update index=5 min"), an estimated time remaining to complete update of the index settings (e.g., Estimated time remaining=4 min), and/or a visual indication of the progress of updating the index (e.g., a progress bar indicating a percentage completion of the update of the index settings).

The dialogue box 520 may include a "Cancel" button. Selection of the "Cancel" button prior to completion of updating of the index (block 732) may result in cancelling the updating of the index 140 (bock 733). Cancelling the updating of the index 140 may undo any changes to the index that have been caused by the updating of the index 140 to that point (e.g., restoring the prior versions of the index configuration file that was to be replaced by the updated index configuration file). Cancelling the updates to the index (block 733) may be followed by display of the index editing GUI 500a (block 720 of FIG. 7B).

Figure 5C:
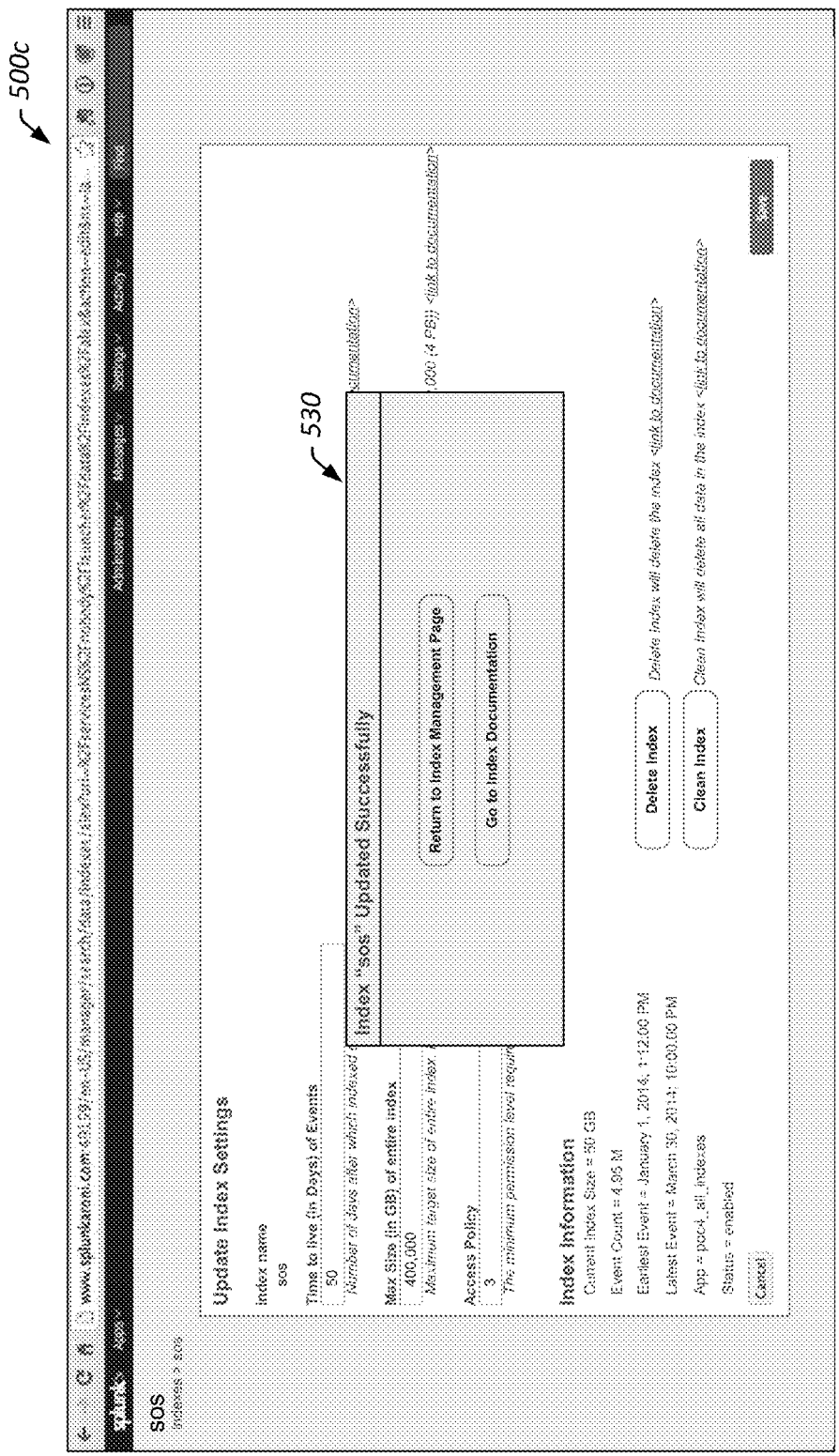

The index update progress GUI 500b may continue to be displayed while the index settings are being updated, with continued updates to the estimated time remaining and the progress percentage so that the user 108 may be apprised of the status of the update to the index 140. Upon completion of the index update (block 734), an index update confirmation GUI may be displayed (block 735). FIG. 5C illustrates an example index update confirmation GUI 500c in accordance with the disclosed embodiments. The index update confirmation GUI 500c may include, for example, a dialogue box 530 indicating whether the index settings were completed successfully (e.g., "Index 'sos' Updated Successfully"). The indication may be accompanied by a "Return to Index Management Page" button and a "Go to Index Documentation" button. Selection of the "Return to Index Management Page" button (block 736) may result in display of the index management overview GUI 400 (block 704 of FIG. 7A). Selection of the "Go to Index Documentation" button (block 737) may result in display of general documentation relating to indexes (block 738). If no selections are made, the index update confirmation GUI 500c may continue to be displayed (block 735).

Figure 5D:
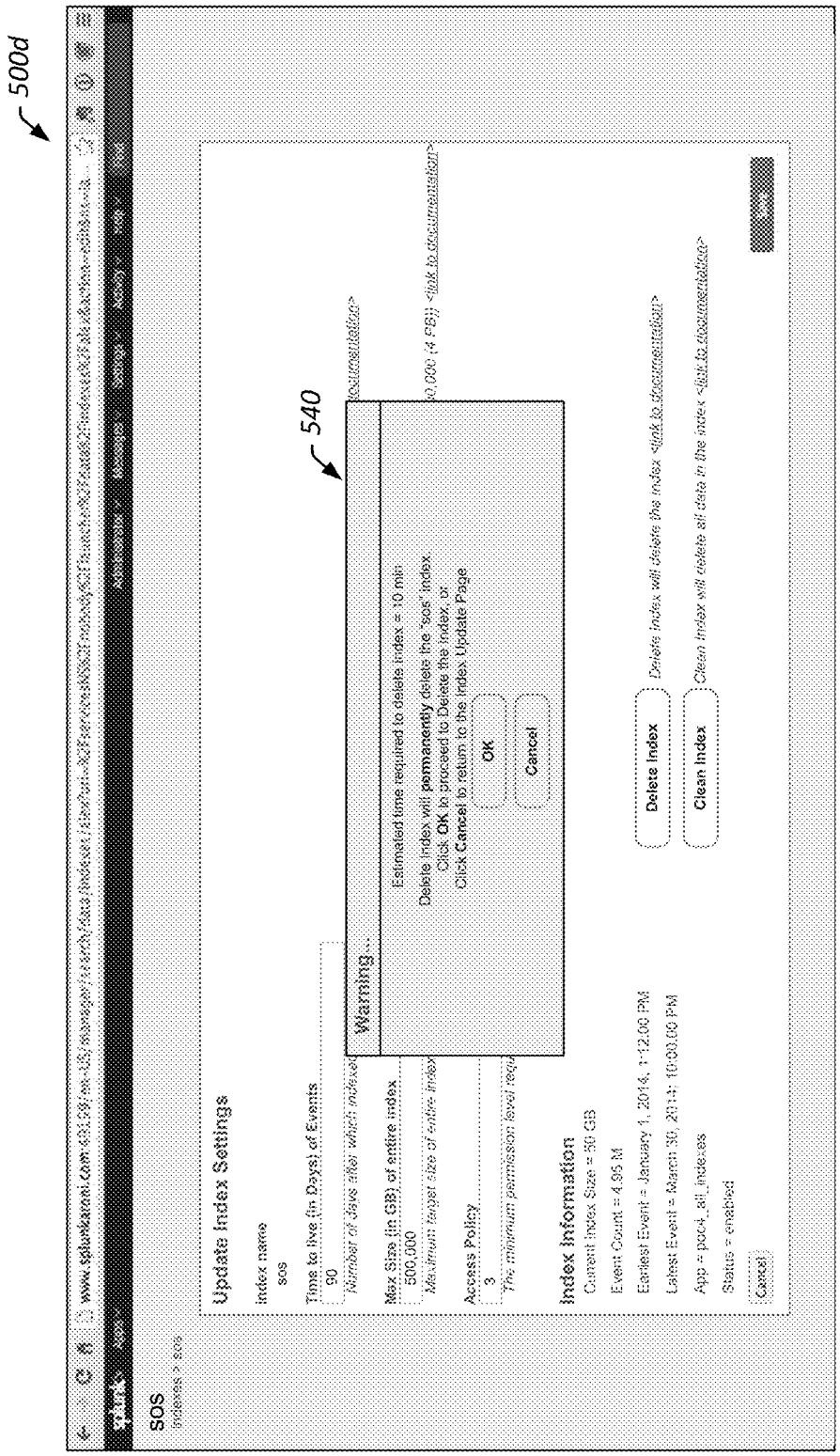
Figure 7D:
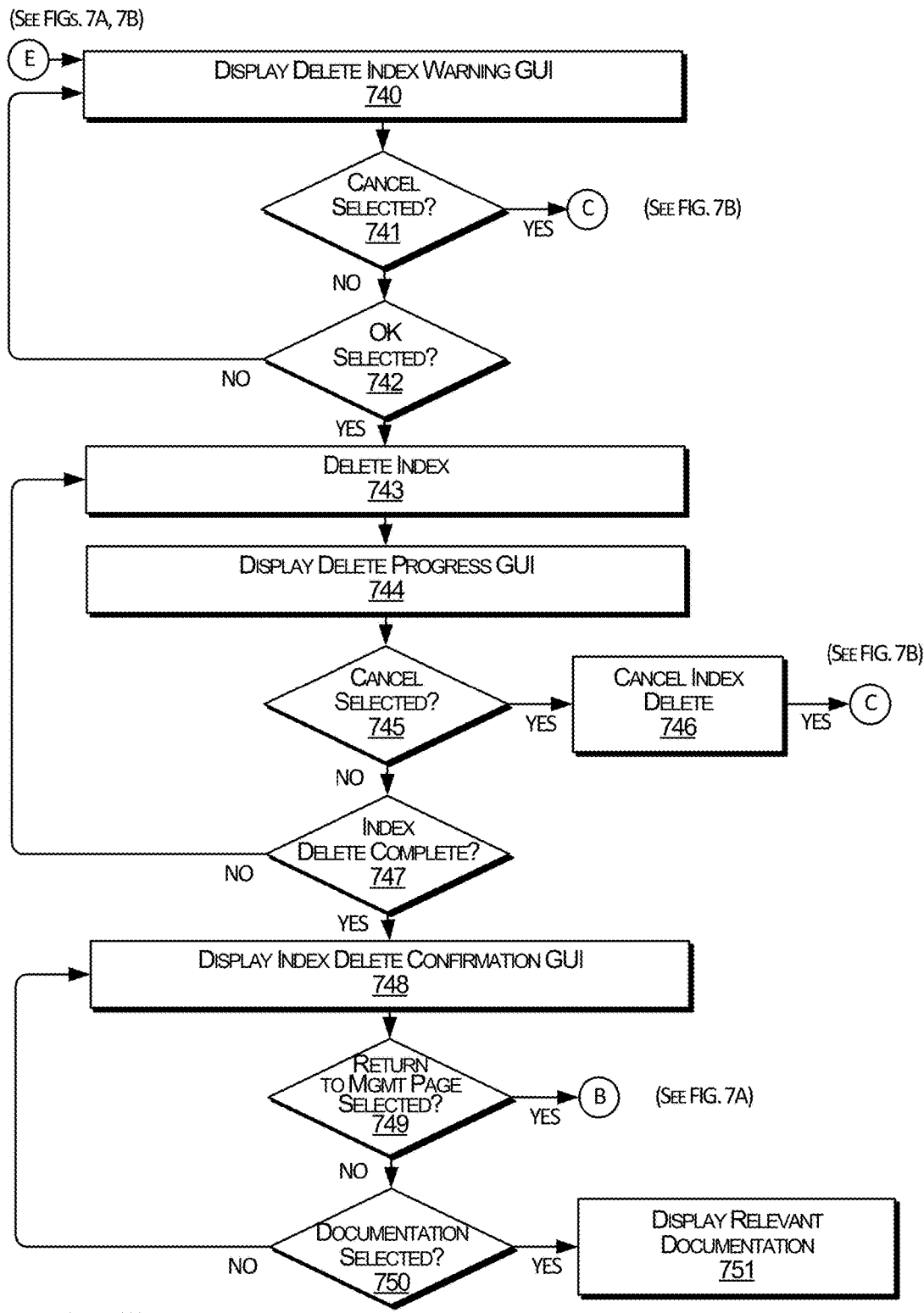

Referring to FIG. 7D, in some embodiments, a delete index warning GUI can be displayed (block 740). The delete index warning may provide an indication of the consequences of proceeding with deleting the index 140, and/or may require additional confirmation by the user 108 prior to proceeding with deletion of the index 140. FIG. 5D illustrates an example delete index warning GUI 500d in accordance with the disclosed embodiments. The delete index warning GUI 500c may include a dialogue box 540 that indicates the estimated time required to delete the index 140 (e.g., "Estimated time required to delete index=10 min), a description of the consequences of deleting the index 140 (e.g., "Delete Index will permanently delete the "sos" index"), and a requirement that the user 108 confirm that the user wants to proceed with the deletion of the index 140 (e.g., "Click OK to proceed to Delete the Index, or Click Cancel to return to the Index Update Page"). If the "Cancel" button is selected (block 741), the index editing GUI 500a may be displayed (block 720 of FIG. 7B).

If the "OK" button is selected (block 742), the process may proceed to deleting the index 140 (block 743) and display of an index delete progress GUI (block 744). In some embodiments, deleting the index 140 may include generating an index configuration file that does not include the index 140, and distributing the index configuration file to one or more entities of the system 102, such as some or all of the indexers 116 and/or the search head 120 as described herein. In response to applying the configuration file to any indexers 116 that manage the index 140 or a copy thereof may delete the index 140 from the data stores 118. That is, the index 140 may be completely deleted from the system 102.

Figure 5E:
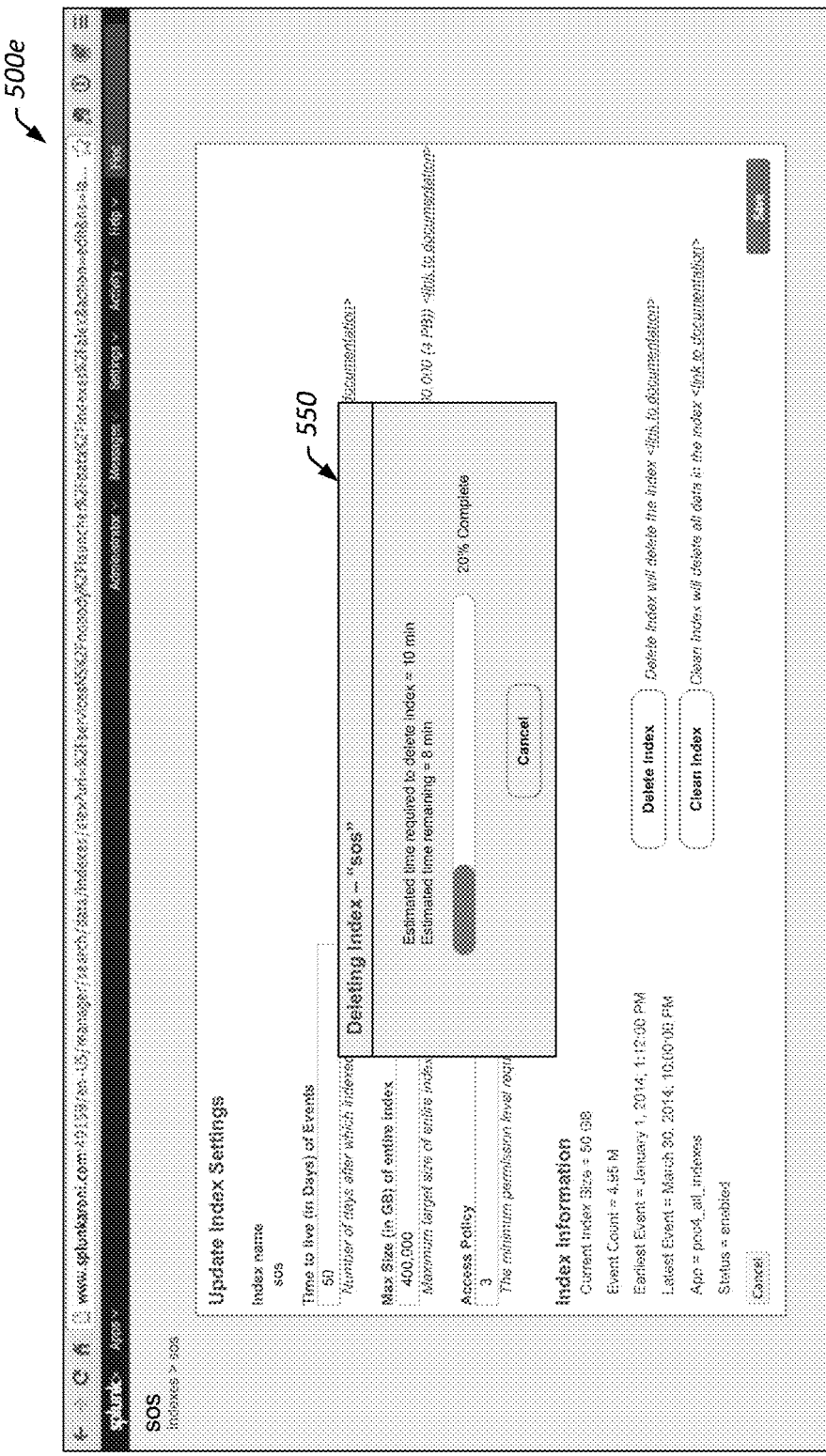

In some embodiments, while the deletion of the index 140 is being conducted, an index delete progress GUI may be displayed (block 744). The index delete progress GUI may include a dialogue box 550 that provides information relating to the status of the deletion of the index 140 (e.g., including generation of the index configuration file that does not include the index 140, distribution of the index configuration file to the entities of the system 102, and the removal of various copies of the index 140 from the data stores 118). FIG. 5E illustrates an example index delete progress GUI 500e in accordance with the disclosed embodiments. The index delete progress GUI 500e may include deletion progress information that can, for example, indicate an estimated time required to delete the index 140 (e.g., "Estimated time required to delete index=10 min"), an estimated time remaining to complete deletion of the index settings (e.g., "Estimated time remaining=8 min"), and/or a visual indication of the progress of deleting the index (e.g., a progress bar indicating a percentage completion of the deletion of the index 140).

The index delete progress GUI 500e may include a "Cancel" button. Selection of the "Cancel" button (block 745) prior to completion of deletion of the index 140 may result in cancelling the deletion of the index 140 (bock 746). In some embodiments, a temporary back-up copy of the index may be stored, and cancelling the deletion of the index 140 may cause the index 140 to be restored using the back-up copy of the index 140. Cancelling the deletion of the index 140 (block 746) may be followed by display of the index editing GUI 500a (block 720 of FIG. 7B).

Figure 5F:
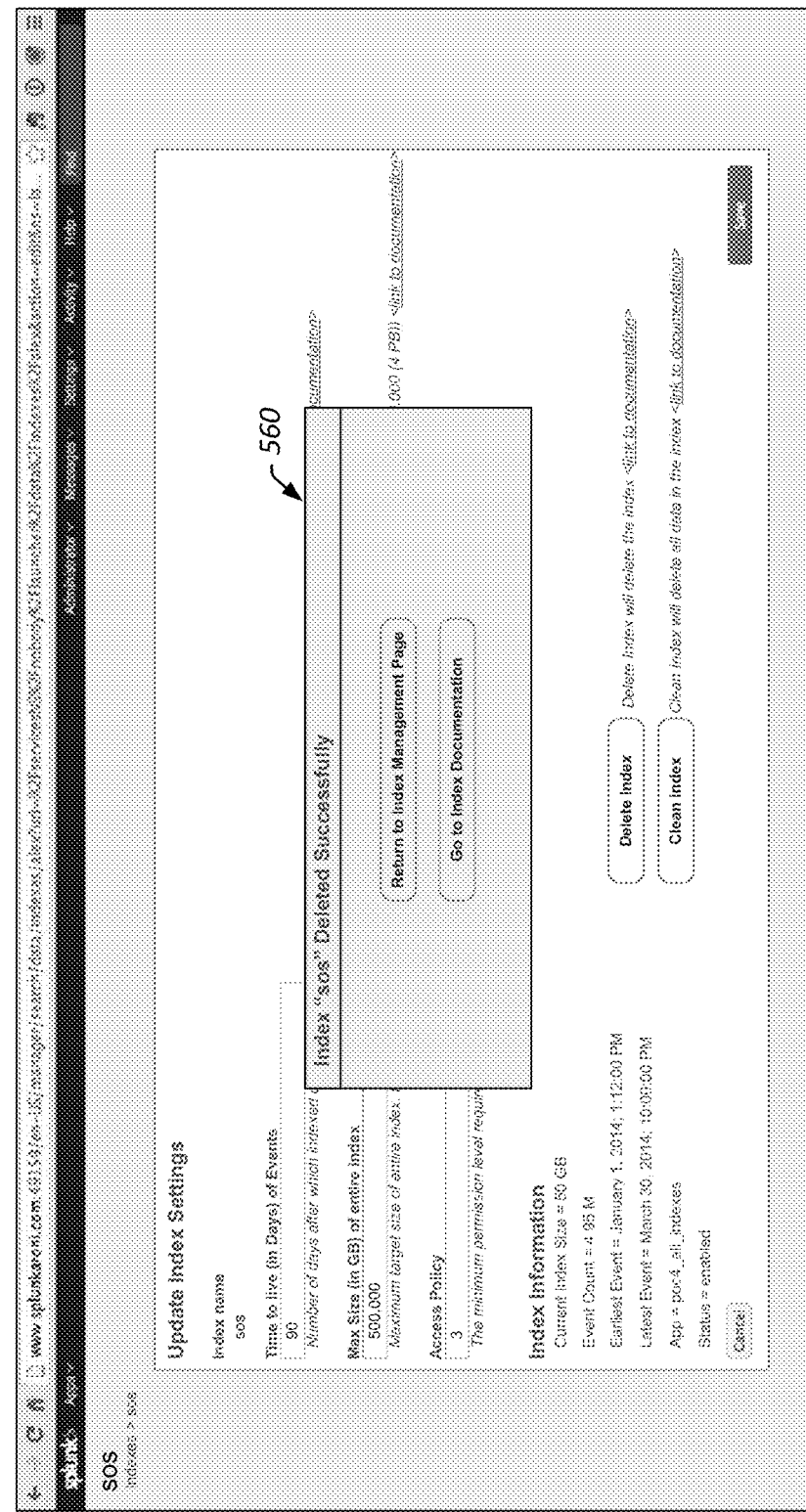

The index delete progress GUI 500e may continue to be displayed while the index 140 is being deleted, with continued updates to the estimated time remaining and the progress percentage so that the user 108 may be apprised of the status of the deletion of the index 140. Upon completion of deletion of the index (block 747), an index delete confirmation GUI may be displayed (block 748). FIG. 5F illustrates an example index delete confirmation GUI 500f in accordance with the disclosed embodiments. The index delete confirmation GUI 500f may include a dialogue box 560 that, for example, provides an indication of whether or not the index 140 was deleted successfully (e.g., "Index 'sos' Deleted Successfully"). The indication may be accompanied by a "Return to Index Management Page" button and a "Go to Index Documentation" button. Selection of the "Return to Index Management Page" button (block 749) may result in display of the index management overview GUI 400 (block 704 of FIG. 7A). Notably, as a result of the index 140 being deleted, a row for the index 140 may no longer be present in the table of indexes 402 of the index management overview GUI 400. For example, as a result of deleting the index "sos," the index management overview GUI may look similar to that of the GUI 400 of FIG. 7A or the GUI 400' of FIG. 7B, except the row for the "sos" index 140 may be removed. The selection of the "Go to Index Documentation" button (block 750) may result in the interactive index management GUI displaying general documentation relating to indexes (block 751). If no selections are made, the index delete confirmation GUI 500f may continue to be displayed (block 748).

Figure 5G:
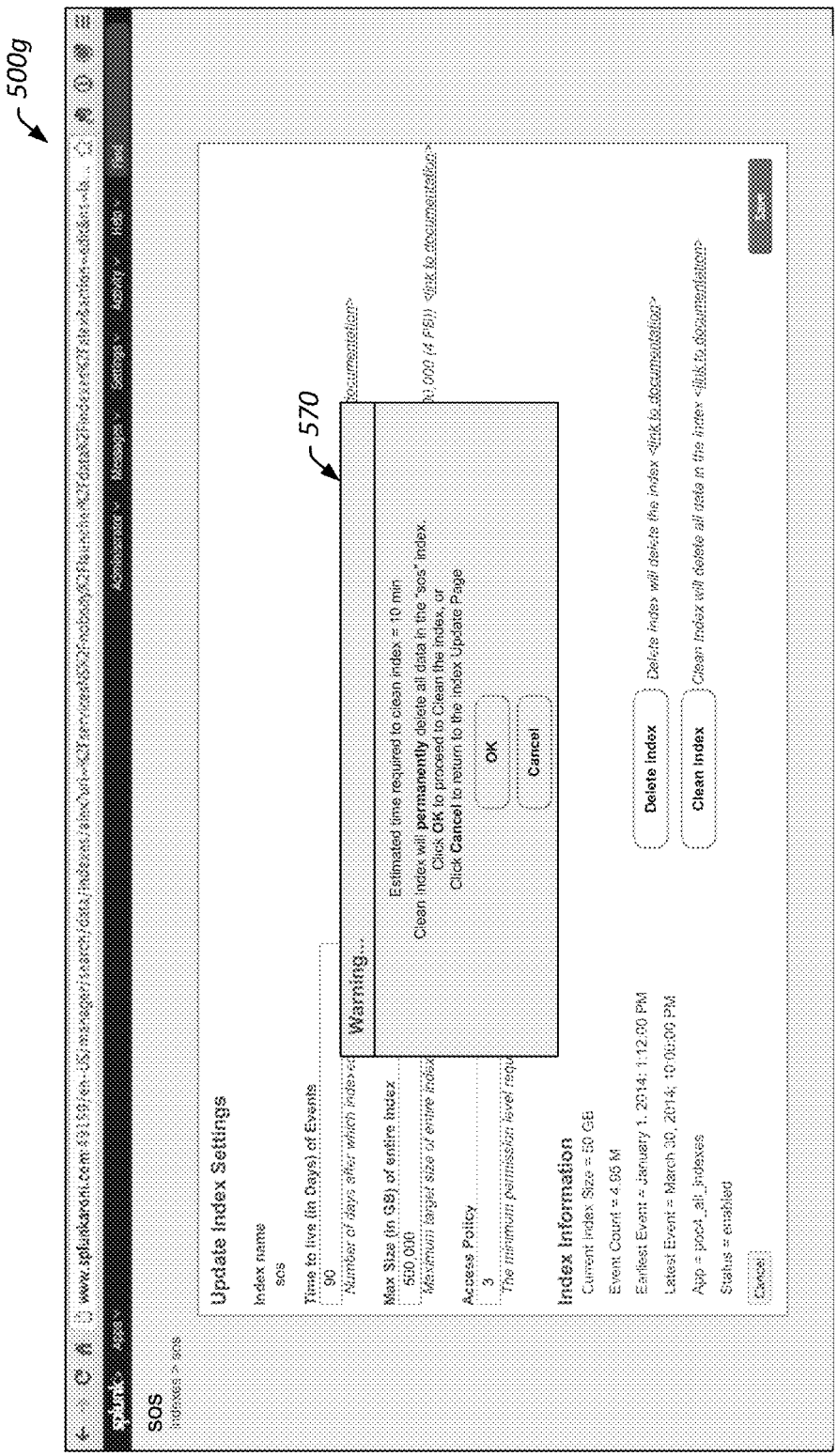
Figure 7E:
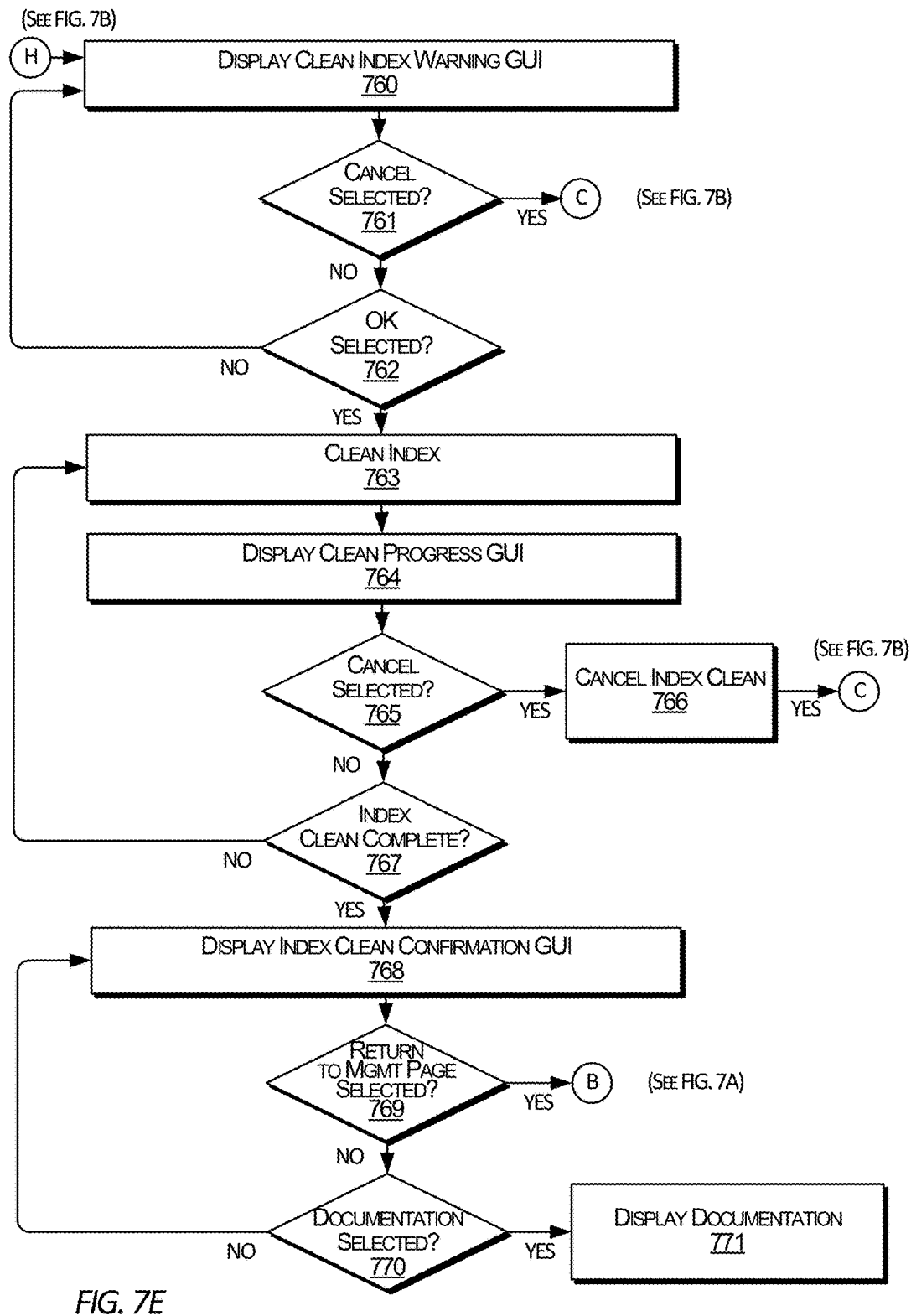

Referring to FIG. 7E, in some embodiments, a clean index warning GUI can be displayed (block 760). The clean index warning GUI may provide an indication of the consequences of proceeding with cleaning the index 140, and/or may require additional confirmation by the user 108 prior to proceeding with cleaning the index 140. FIG. 5G illustrates an example clean index warning GUI 500g in accordance with the disclosed embodiments. The clean index warning GUI 500g may include a dialogue box 570 that indicates the estimated time required to clean the index 140 (e.g., "Estimated time required to clean index=10 min), a description of the consequences of cleaning the index 140 (e.g., "Clean Index will permanently delete all data in the "sos" index"), and a requirement that the user 108 confirm that the user wants to proceed with cleaning the index 140 (e.g., "Click OK to proceed to Clean the Index, or Click Cancel to return to the Index Update Page"). If the "Cancel" button is selected (block 761), the index editing page GUI 500a may be displayed (block 720 of FIG. 7B).

If the "OK" button is selected (block 762), the process may proceed to cleaning the index 140 (block 763), and the interactive index management GUI may display an index clean progress GUI (block 764). In some embodiments, cleaning the index 140 may include commanding the indexers 116 that manage the index 140 (or a copy thereof) to empty the buckets of the index 140, and to delete the index file 144 and/or the raw data file 146 from each of the buckets 142 of the index 140. That is, all of the data stored in the index 140 may be completely deleted from the system 102.

Figure 5H:
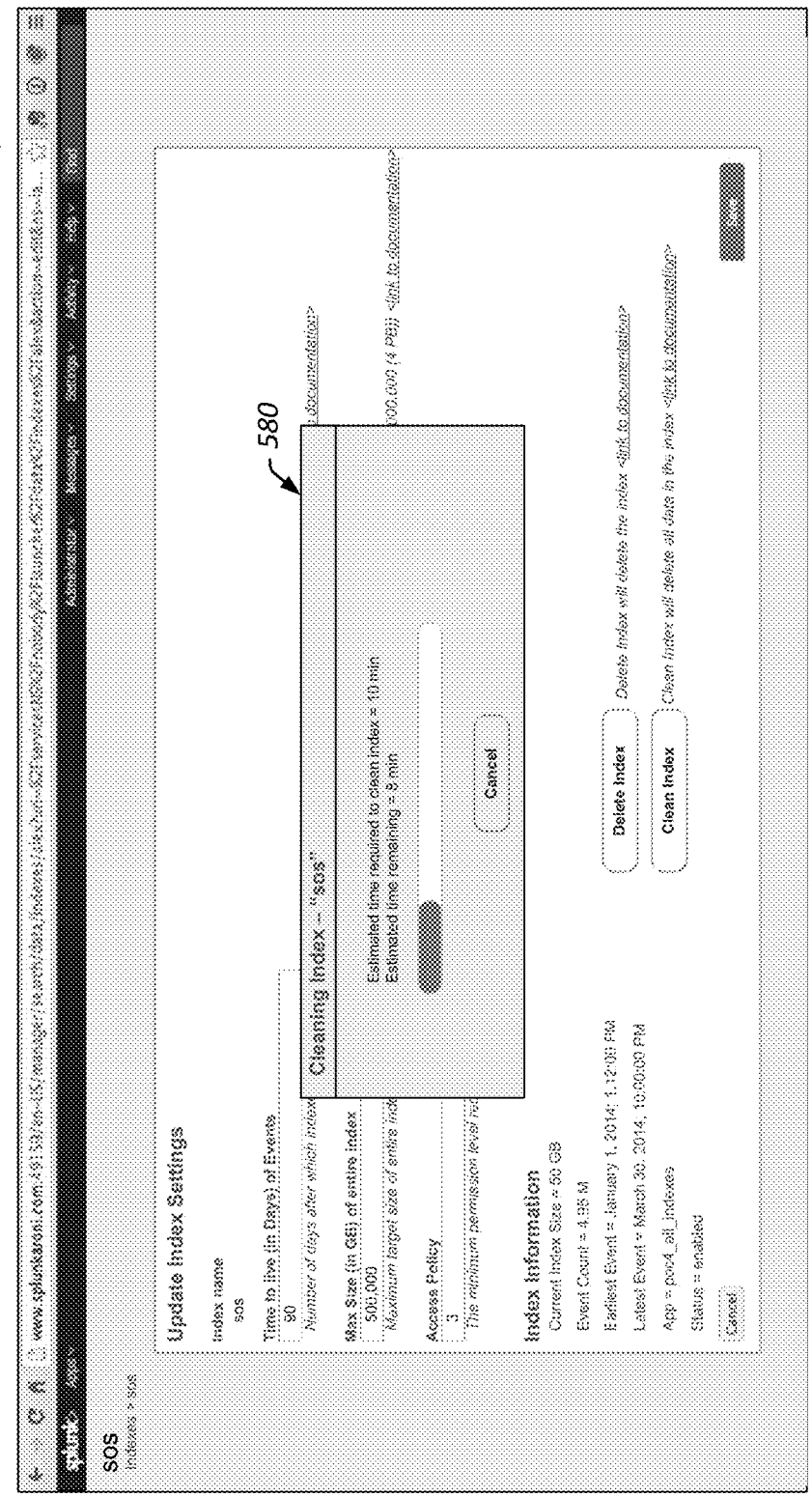

In some embodiments, while the cleaning of the index 140 is being conducted, an index clean progress GUI may be displayed (block 764). The index clean progress GUI may provide information relating to the status of the cleaning of the index 140 (e.g., including emptying the buckets 142 of the index 140). FIG. 5H illustrates an example index clean progress GUI 500h in accordance with the disclosed embodiments. The index clean progress GUI 500h may include a dialogue box 580 providing cleaning progress information that can, for example, indicate an estimated time required to clean the index 140 (e.g., "Estimated time required to clean index=10 min"), an estimated time remaining to complete cleaning of the index settings (e.g., "Estimated time remaining=8 min"), and/or a visual indication of the progress of cleaning the index (e.g., a progress bar indicating a percentage completion of cleaning the index 140).

The index clean progress GUI 500h may include a "Cancel" button. Selection of the "Cancel" button (block 765) prior to completion of cleaning of the index may result in cancelling the cleaning of the index 140 (block 766). In some embodiments, a temporary back-up copy of the data in the index 140 (e.g., the index files 144, the raw data files 146, and/or the like) may be stored, and cancelling the cleaning of the index 140 may cause the index 140 to be restored using the back-up copy of the data in the index 140 (e.g., the buckets 142 may be re-filled using the index files 144, the raw data files 146 of the temporary back-up copy of the data in the index 140). Cancelling of the cleaning of the index (block 766), may be followed by display of the index editing page GUI 500a (block 720 of FIG. 7B).

Figure 5I:
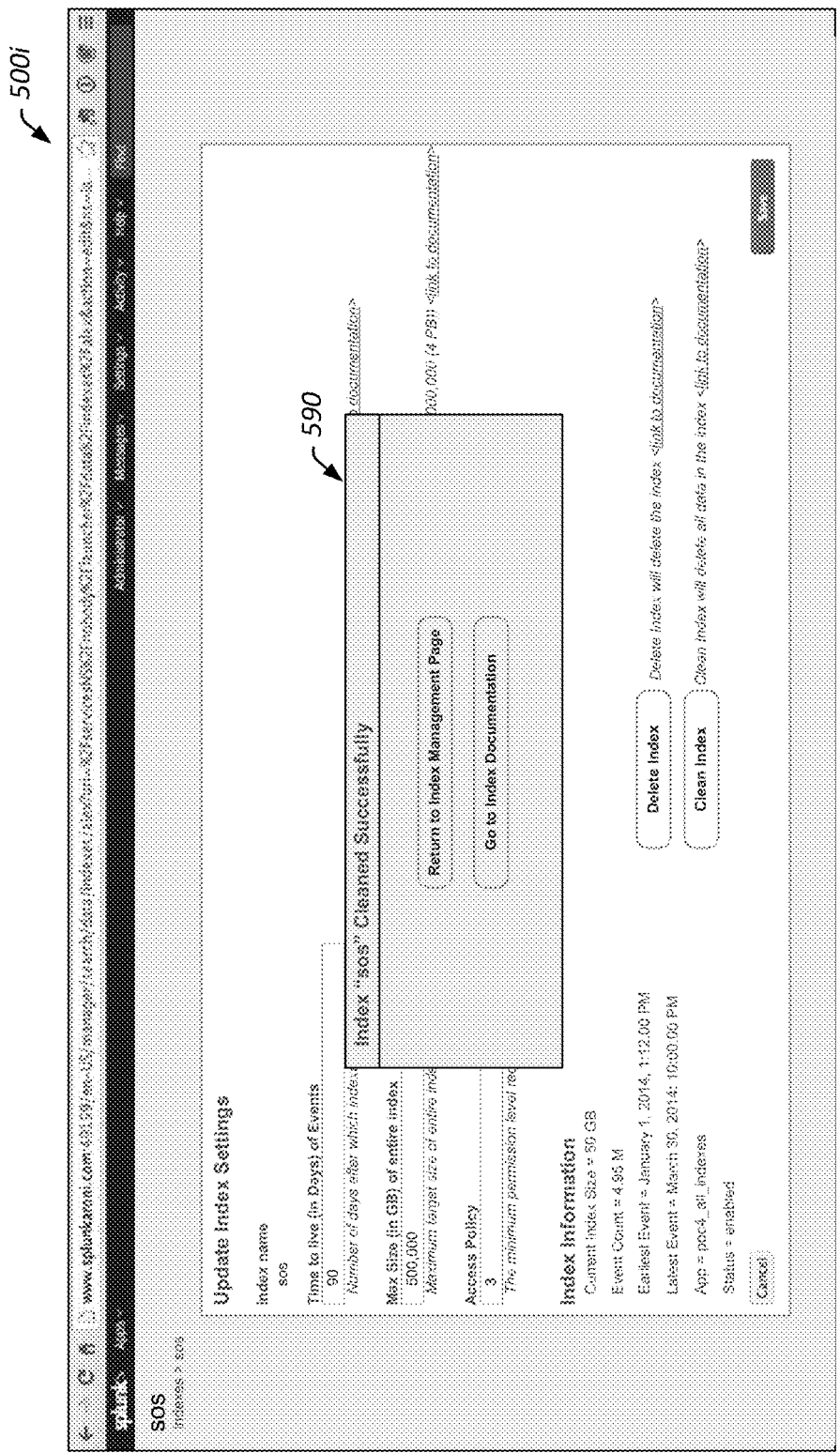

The index clean progress GUI 500h may continue to be displayed while the index 140 is being cleaned, with continued updates to the estimated time remaining and the progress percentage so that the user 108 may be apprised of the status of the cleaning of the index 140. Upon completion of the cleaning of the index (block 767), an index clean confirmation GUI may be displayed (block 768). FIG. 5I illustrates an example index clean confirmation GUI 500i in accordance with the disclosed embodiments. The index clean confirmation GUI 500i may include a dialogue box 590 including, for example, an indication of whether or not the index 140 was cleaned successfully (e.g., "Index 'sos' Cleaned Successfully"). The indication may be accompanied by a "Return to Index Management Page" button and a "Go to Index Documentation" button. Selection of the "Return to Index Management Page" button (block 769) may result in the interactive index management GUI navigating back to display the index management overview GUI 400 (block 704 of FIG. 7A). Notably, as a result of the index 140 being cleaned, the information in the row for the index 140 in the table 402 of indexes of the index management overview GUI 400 may be updated accordingly. For example, as a result of cleaning the index "sos,", the index management overview GUI may look similar to that of the GUI 400 of FIG. 7A or the GUI 400' of FIG. 7B, but the row for the "sos" index 140 may list a value of 0 MB for the current size, and nulls for event count, earliest event, and latest event. The selection of the "Go to Index Documentation" button (block 770) may result in the interactive index management GUI displaying general documentation relating to the indexes (block 771). If no selections are made, the index clean confirmation GUI 500i may continue to be displayed (block 768).

Figure 6A:
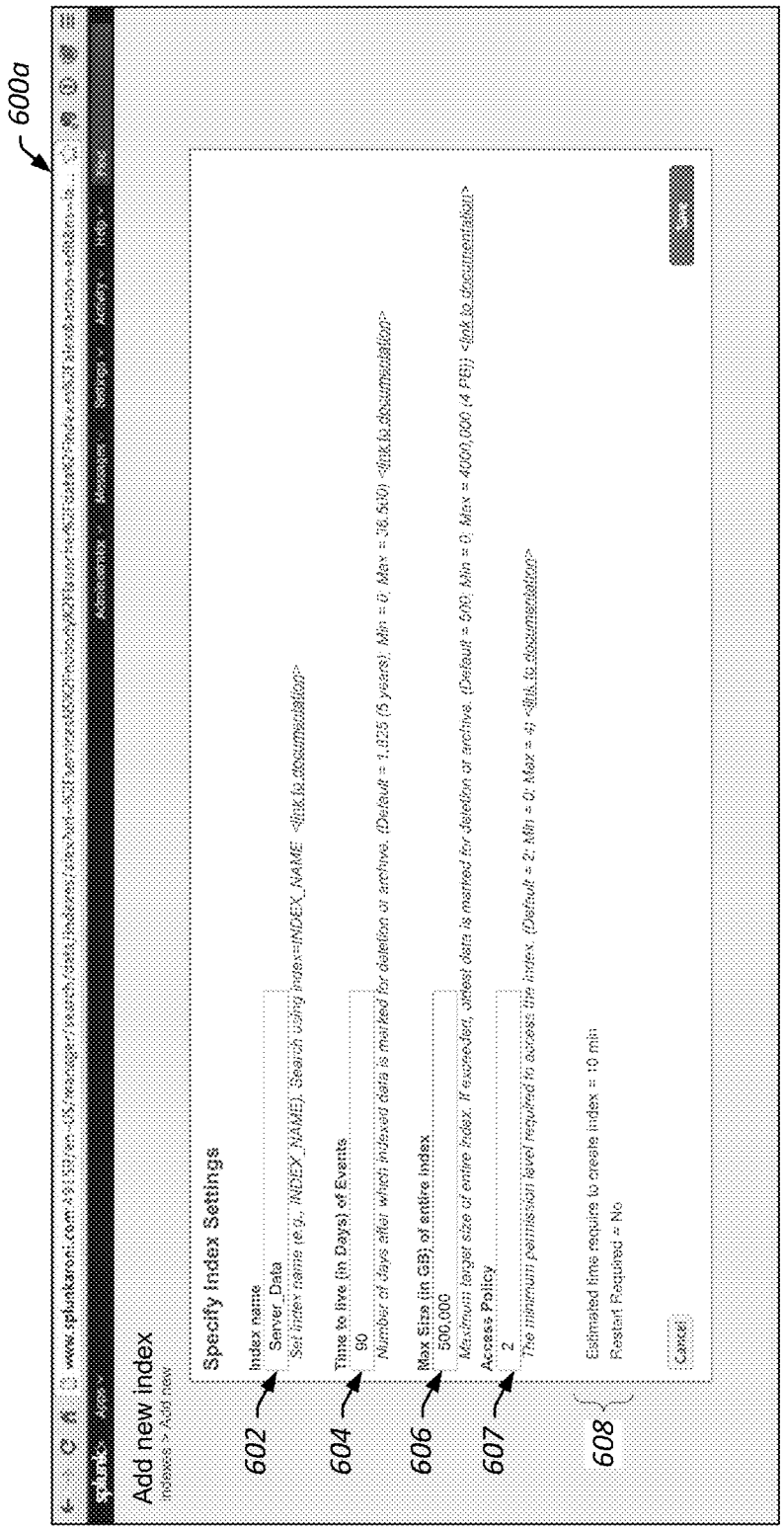
Figure 7F:
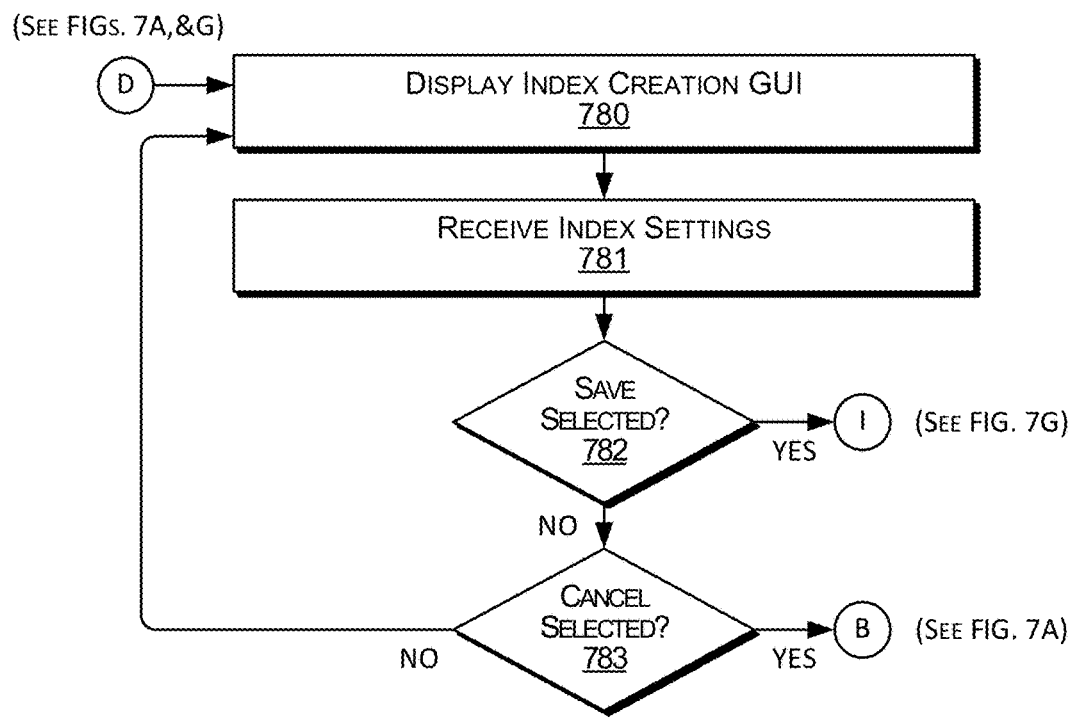

Referring to FIG. 7F, in some embodiments, an index creation GUI may be displayed (block 780). In some embodiments, an index creation GUI may enable a user to create a new index 140 and configure one or more index settings for the new index 140. FIG. 6A illustrates an example index creation progress GUI 600a in accordance with the disclosed embodiments.

As illustrated, the index creation progress GUI 600a may include a name field 602, a retention policy field (Time to live (in Days) of Events) 604, a maximum size field 606, an access policy field 607, and new index information 608. The name field 602 may include an editable field for specifying the name of the new index 140. For example, the user 108 may enter the name "Server_Data" in the name field 602.

The retention policy field 604 may include an editable field for specifying a retention policy for the index 140. For example, the user 108 may enter a retention policy value of 90 (days) in the retention policy field 604. In some embodiments, the retention policy field 604 may be accompanied by a description of the field (e.g., "Number of days after which indexed data is marked for deletion or archive"), default values (e.g., "Default=1,825 (5 years)"), maximum and minimum values (e.g., "Min=0; Max=36,500"), and/or a link to relevant documentation (e.g., a navigable link to documentation explaining how retention policies work and how they should be specified). In some embodiments, the retention policy field 604 may be pre-populated with the default value (e.g., 1,825 (days)).

The maximum size field 606 may an editable field for specifying a maximum size of the new index 140. For example, the user 108 may enter a value of 500,000 (GB) in the maximum size field 606. In some embodiments, the maximum size field 606 may be accompanied by a description of the field (e.g., "Maximum target size of entire index. If exceeded, oldest data is marked for deletion or archive"), default values (e.g., "Default=500,000"), maximum and minimum values (e.g., "Min=0; Max=4,000,000 (4 PB)"), and/or a link to relevant documentation (e.g., a navigable link to documentation explaining how maximum index sizes work and how they should be specified). In some embodiments, the maximum size field 606 may be pre-populated with the default value (e.g., 500,000 (GB)).

The access policy field 607 may include a field that indicates the minimum permission level required to access the index 140. For example, in the illustrated embodiment, the access policy field 607 indicates a current access policy of level "2." In some embodiments, the access policy field 607 may be accompanied by a description of the field (e.g., "The minimum permission level required to access the index"), default values (e.g., "Default="2"), maximum and minimum values (e.g., "Min=0; Max=4"), and/or a link to relevant documentation (e.g., a navigable link to documentation explaining how access policies work and how they should be specified).

The new index information 608 may include information about creation of the new index 140, such as an estimated time to create the index (e.g., "Estimated time required to create index=10 min"), an indication of whether or not a restart of the system 102 is required to create the new index (e.g., "Restart Required=No").

The index creation progress GUI 600a may include a "Save" button. Selection of the "Save" button may initiate a process to save and apply the currently selected index settings. If, for example, the user 108 edits the index settings (block 781) and selects the "Save" button (block 782), then the index 140 may be created (block 790 of FIG. 7G, described below) and/or an index creation progress GUI may be displayed (block 791 of FIG. 7G, described below). For example, if a user 108 enters a value of 90 (days) in the retention policy field 604, and enters a value of 500,000 (GB) in the maximum size field 606, when the user selects the "Save" button the index settings 152 (e.g., including the settings listed in the retention policy field 604, the maximum size field 606, and/or the access policy field 607) may be transmitted to the index management module 150, and the index management module 150 may initiate a process to create a new index 140, apply the index settings 152 (e.g., generate and distribute a corresponding index definition 154 and distribute an index configuration file including the index definition 154). Thus, a process to create the index 140, applying the user-selected index setting values, may not be initiated until the "Save" button is selected.

The index creation progress GUI 600a may include a "Cancel" button. Selection of the "Cancel" button (block 783) may cancel the index creation process, resulting in the display of the index management overview GUI 400 (block 704 of FIG. 7A).

Figure 7G:
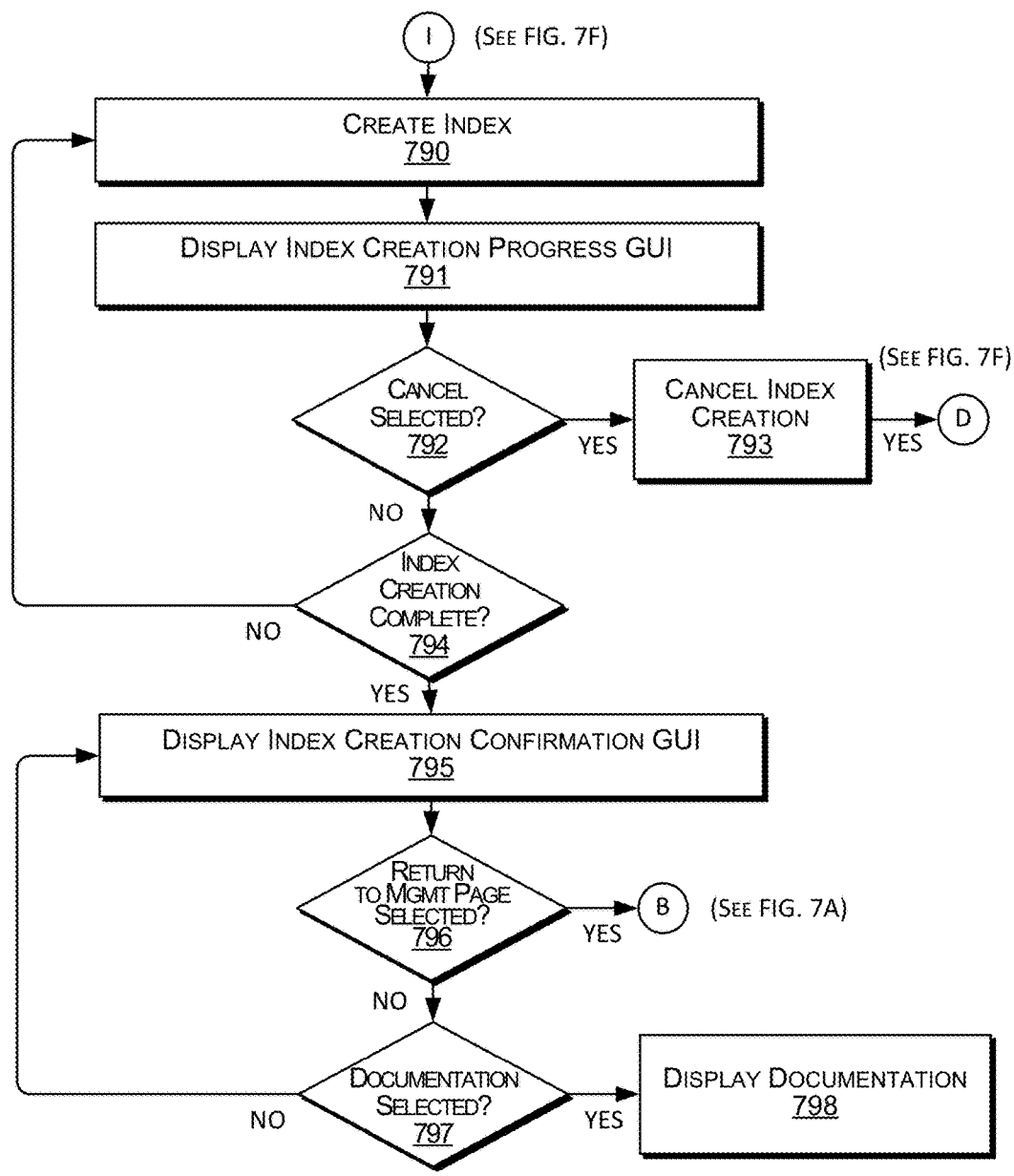

Referring to FIG. 7G, in some embodiments, creation of the new index 140 may be conducted (block 790), and the interactive index management GUI may display an index creation progress GUI (block 791). In some embodiments, creating the new index 140 may include generating an index configuration file, including generating an index configuration file using the submitted set of index settings 152 (e.g., including an index definition 154 defining the new index 140 and the associated settings listed in the retention policy field 604, the maximum size field 606 and/or the access policy field 607), and distributing the index configuration file to one or more entities of the system 102, such as some or all of the indexers 116 and/or the search head 120 as described herein.

Figure 6B:
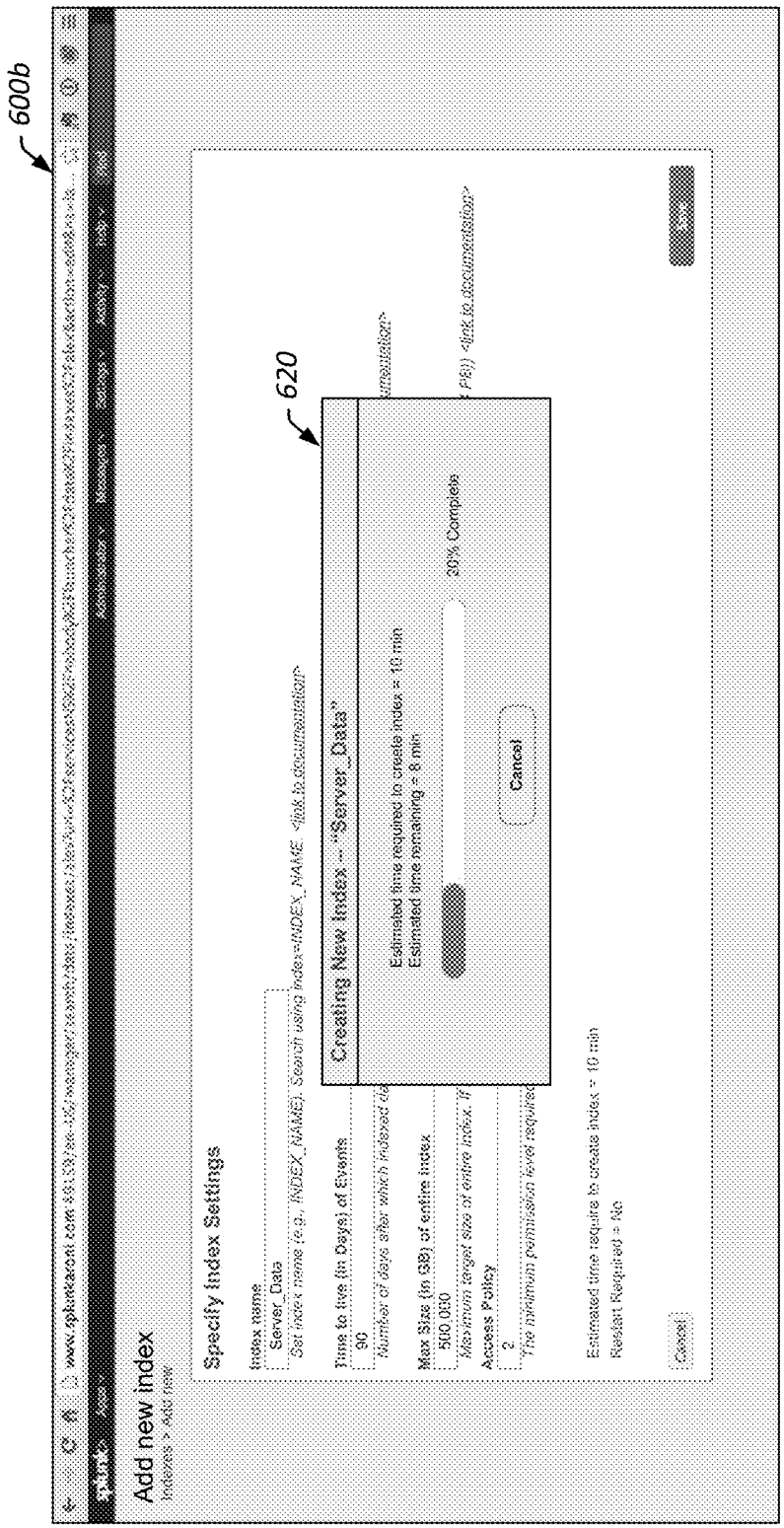

In some embodiments, while the new index 140 is being created, an index creation progress GUI may be displayed (block 791). The index creation progress GUI 600b in FIG. 6B may include a dialogue box 620 that provides information relating to the status of the creation of the new index 140 (e.g., including generation of the index configuration file including the index settings for the new index 140, and the distribution of the index configuration file to the entities of the system 102). FIG. 6B illustrates an example index creation progress GUI 600b in accordance with the disclosed embodiments. The index creation progress GUI 600b may include index progress information that can, for example, indicate an estimated time required to create the new index 140 (e.g., "Estimated time required to create index=10 min"), an estimated time remaining to complete creation of the new index 140 (e.g., Estimated time remaining=8 min), and/or a visual indication of the progress of creating the index 140 (e.g., a progress bar indicating a percentage completion of creating the new index 140).

The index creation progress GUI 600b may include a "Cancel" button. Selection of the "Cancel" button prior to completing creation of the index (block 792) may result in cancelling creation of the new index 140 (block 793). Cancelling the updating of the index 140 may undo any changes to the index that have been caused by the updating of the index 140 to that point (e.g., restoring the prior versions of the index configuration file that was to be replaced by the updated index configuration file), and removing any portions of the new index 140 that have been created to that point. Cancelling of the creation of the new index (block 793), may be followed by display of the index creation GUI 600a (block 780 of FIG. 7F).

Figure 6C:
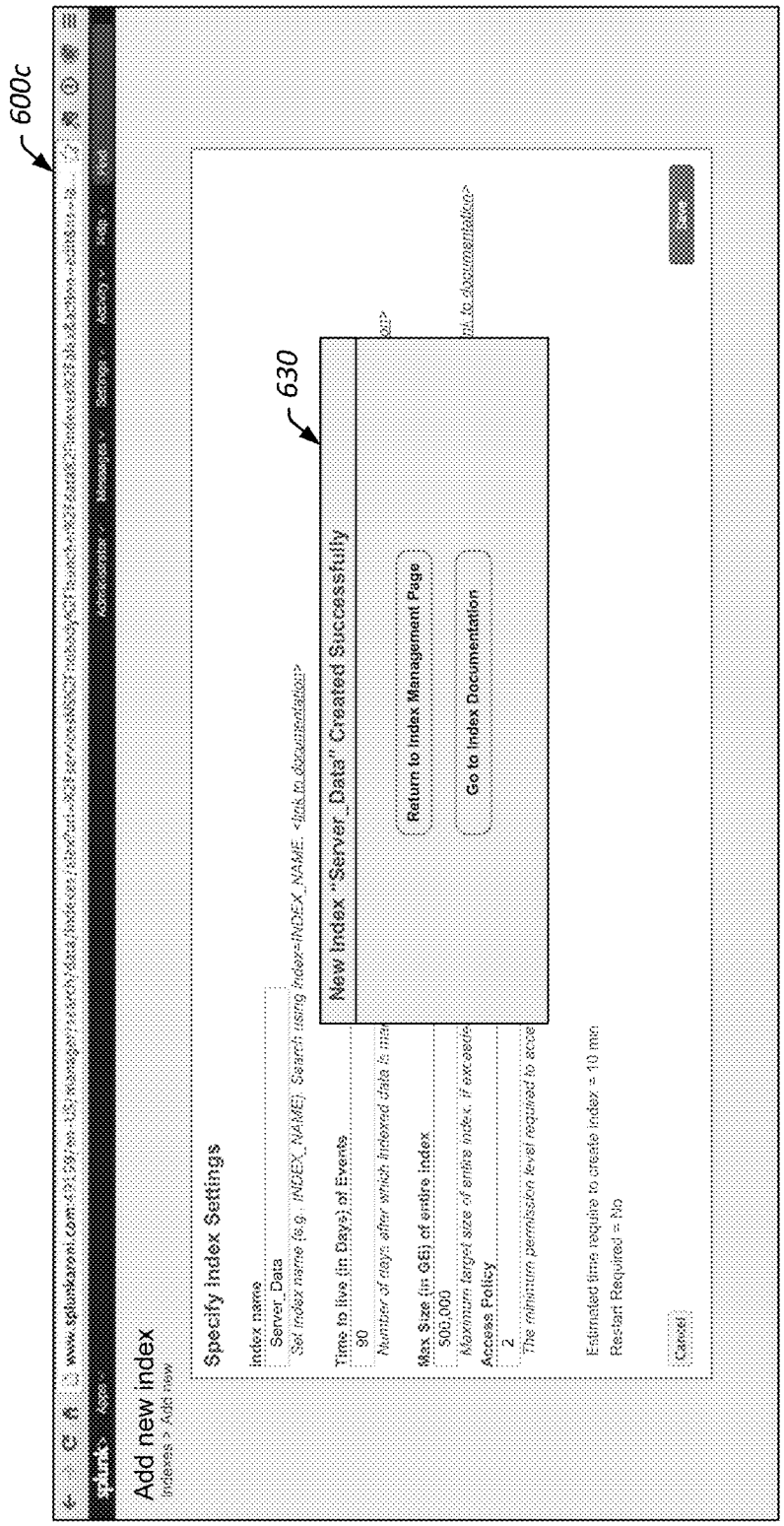

The index creation progress GUI 600b may continue to be displayed while the index 140 is being created, with continued updates to the estimated time remaining and the progress percentage so that the user 108 may be apprised of the status of the creation of the new index 140. Upon completion of creation of the index update (block 794), an index creation confirmation GUI may be displayed (block 795). FIG. 6C illustrates an example index creation confirmation GUI 600c in accordance with the disclosed embodiments. The index creation confirmation GUI 600c may include a dialogue box 630 including, for example, an indication of whether the creation of the new index 140 was or was not completed successfully (e.g., "Index "Server_Data" Created Successfully"). The indication may be accompanied by a "Return to Index Management Page" button and a "Go to Index Documentation" button. Selection of the "Return to Index Management Page" button (block 796) may result in the interactive index management GUI navigating back to display the index management overview GUI 400 (block 704 of FIG. 7A). Selection of the "Go to Index Documentation" button (block 797) may result in the interactive index management GUI displaying general documentation relating to the indexes (block 798). If no selections are made, the index creation confirmation GUI 600c may continue to be displayed (block 795).

Figure 8:
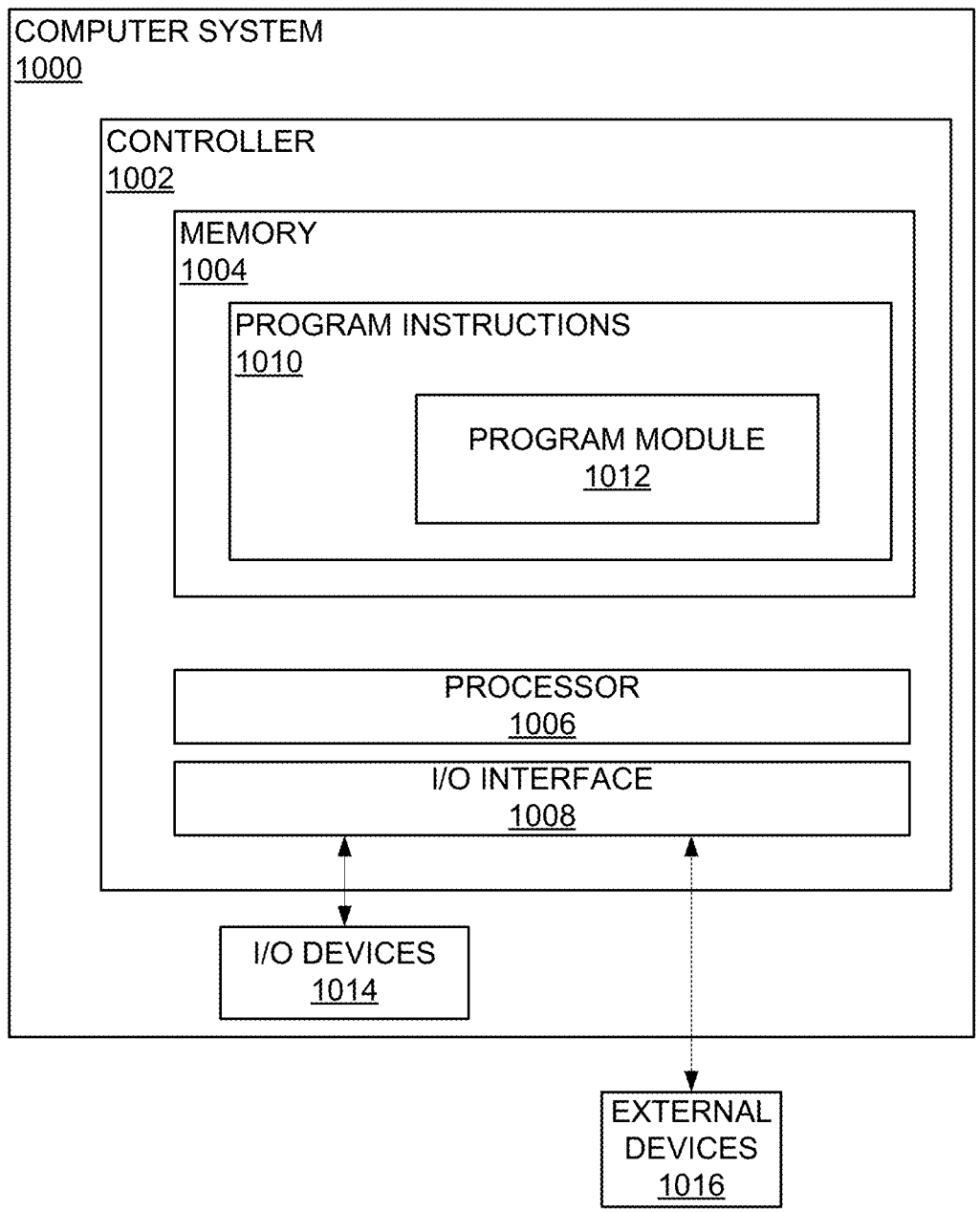
FIG. 8 is a diagram that illustrates an example computer system in accordance with the disclosed embodiments.

FIG. 8 is a diagram that illustrates an example computer system 1000 in accordance with the disclosed embodiments. In some embodiments, the computer system 1000 includes a controller 1002 for controlling the operational aspects of the computer system 1000. In some embodiments, the controller 1002 includes a memory 1004, a processor 1006, and an input/output (I/O) interface 1008. The memory 1004 may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), and/or the like. The memory 1004 may include a non-transitory computer-readable storage medium having program instructions 1010 stored thereon that are executable by a computer processor (e.g., the processor 1006) to cause the functional operations (e.g., the methods, routines, or processes) described herein. The program instructions 1010 may include program modules 1012 (e.g., including program instructions) that are executable by the processor 1006 to provide some or all of the functionality described herein, including that described with regard to the entities described (e.g., the data sources 112, the forwarders 114, the indexers 116, the index data stores 118, the search heads 120, and/or the client devices 104), and/or the methods described herein (e.g., methods 200, 700 and so forth). The program instructions 1010 may include, for example, the index management module 150.

The processor 1006 may be any suitable processor capable of executing/performing program instructions. The processor 1006 may include a central processing unit (CPU) that carries out program instructions (e.g., program instructions of the program module(s) 1012) to perform arithmetical, logical, and input/output operations described herein, including those described with regard to the data sources 112, the forwarders 114, the indexers 116, the index data stores 118, the search heads 120, the client devices 104, and/or other entities described. The processor 1006 may include one or more processors.

The I/O interface 1008 may provide an interface for communication with one or more I/O devices 1014, such as a mouse/keyboard/touchscreen, a graphical user interface (GUI) (e.g., a display), and/or the like. A display may include a suitable electronic display that can display GUIs and/or the like. Devices may be connected to the I/O interface 1008 via a wired or wireless connection. The I/O interface 1008 may provide an interface for communication with one or more external devices 1016, such as various components and entities of the environment 100, including the network 106.

Accordingly, provided in some embodiments are systems and methods for managing data indexes, including receiving user-provided index settings (e.g., via an index management GUI and/or applying them (e.g., via generation and distribution of an index definition to entities of a data processing system). The following describes an example data system that may employ the described embodiments, including employing one or more index definitions generated and distributed using the above described techniques.

1.1 Overview of Example Performance Data System

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that can include different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements, and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

Figure 9:
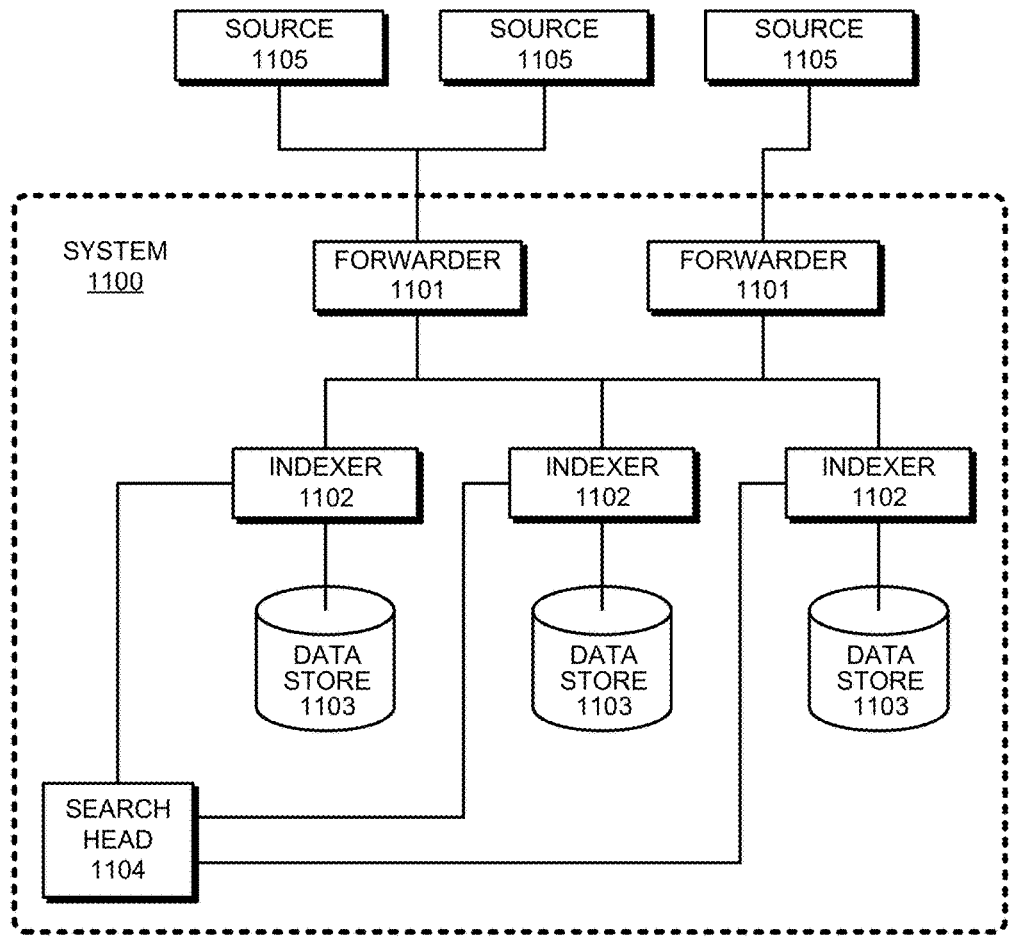
FIG. 9 presents a block diagram of an example event-processing system in accordance with the disclosed embodiments.

FIG. 9 presents a block diagram of an exemplary event-processing system 1100, similar to the SPLUNK® ENTERPRISE system. System 1100 includes one or more forwarders 1101 that collect data obtained from a variety of different data sources 1105, and one or more indexers 1102 that store, process, and/or perform operations on this data, wherein each indexer operates on data contained in a specific data store 1103. These forwarders and indexers can comprise separate computer systems in a data center, or may alternatively comprise separate processes executing on various computer systems in a data center.

During operation, the forwarders 1101 identify which indexers 1102 will receive the collected data and then forward the data to the identified indexers. Forwarders 1101 can also perform operations to strip out extraneous data and detect timestamps in the data. The forwarders 1101 next determine which indexers 1102 will receive each data item and then forward the data items to the determined indexers 1102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 1100 and the processes described below with respect to FIGS. 9-13 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 10:
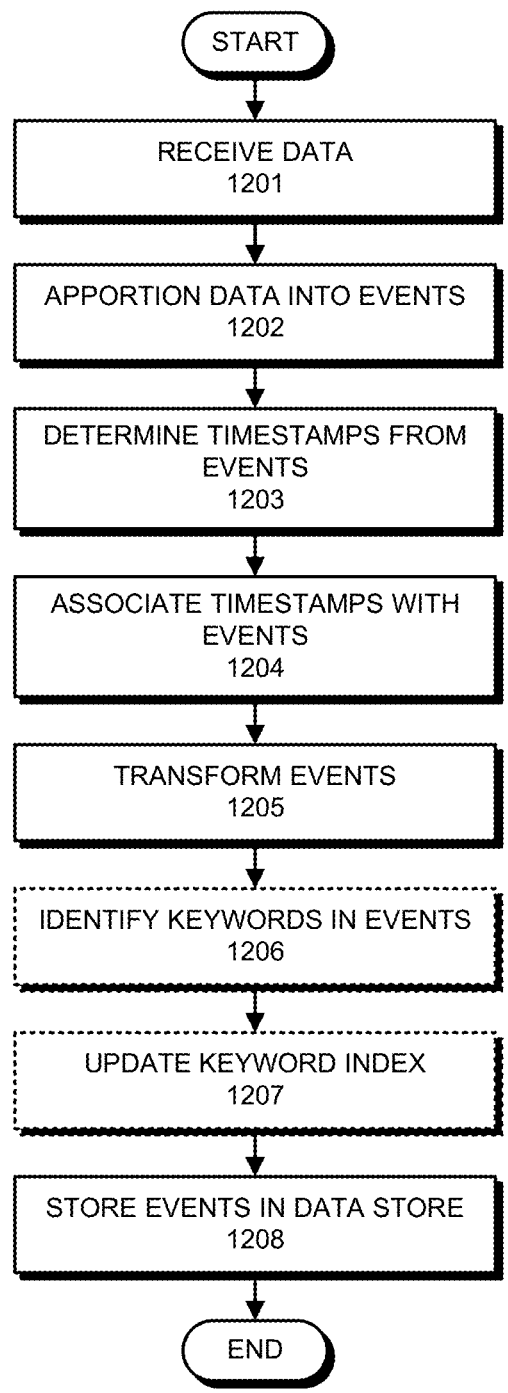
FIG. 10 presents a flowchart illustrating an example of how indexers process, index, and store data received from forwarders in accordance with the disclosed embodiments.

FIG. 10 presents a flowchart illustrating how an indexer processes, indexes, and stores data received from forwarders in accordance with the disclosed embodiments. At block 1201, the indexer receives the data from the forwarder. Next, at block 1202, the indexer apportions the data into events. Note that the data can include lines of text that are separated by carriage returns or line breaks, and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces, or line breaks. In some cases, a user can fine-tune or configure the rules that the indexers use to determine event boundaries in order to adapt the rules to the user's specific requirements.

Next, the indexer determines a timestamp for each event at block 1203. As mentioned above, these timestamps can be determined by extracting the time directly from the data in the event, or by interpolating the time based on timestamps from temporally proximate events. In some cases, a timestamp can be determined based on the time the data was received or generated. The indexer subsequently associates the determined timestamp with each event at block 1204, for example, by storing the timestamp as metadata for each event.

Then, the system can apply transformations to data to be included in events at block 1205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in events in block 1206. Then, at block 1207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or a colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 1208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 1102 is responsible for storing and searching a subset of the events contained in a corresponding data store 1103. By distributing events among the indexers and data stores, the indexers can analyze events for a query in parallel, for example, using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on Apr. 30, 2014, and in U.S. patent application Ser. No. 14/266,817 also filed on Apr. 30, 2014, which are hereby incorporated by reference.

1.4 Query Processing

Figure 11:
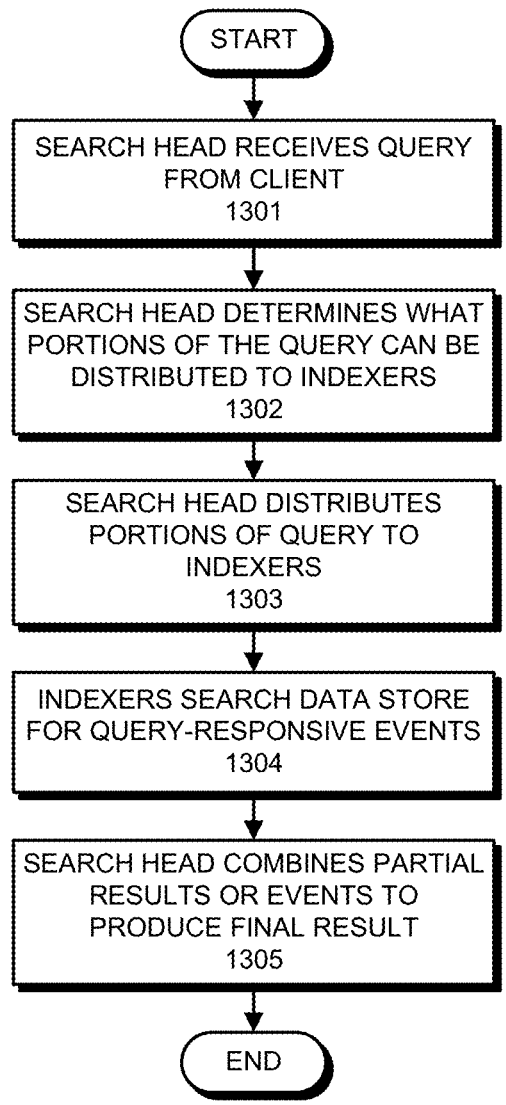
FIG. 11 presents a flowchart illustrating an example of how a search head and indexers perform a search query in accordance with the disclosed embodiments.

FIG. 11 presents a flowchart illustrating how a search head and indexers perform a search query in accordance with the disclosed embodiments. At the start of this process, a search head receives a search query from a client at block 1301. Next, at block 1302, the search head analyzes the search query to determine what portions can be delegated to indexers and what portions need to be executed locally by the search head. At block 1303, the search head distributes the determined portions of the query to the indexers. Note that commands that operate on single events can be trivially delegated to the indexers, while commands that involve events from multiple indexers are harder to delegate.

Then, at block 1304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 1304 may involve using the late-binding scheme to extract values for specified fields from events at the time the query is processed. Next, the indexers can either send the relevant events back to the search head, or use the events to calculate a partial result, and send the partial result back to the search head.

Finally, at block 1305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by the system 1100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these settings to query the indexers to obtain a superset of the eventual results. Then, during a filtering stage, the search head can perform field-extraction operations on the superset to produce a reduced set of search results.

1.5 Field Extraction

Figure 12:
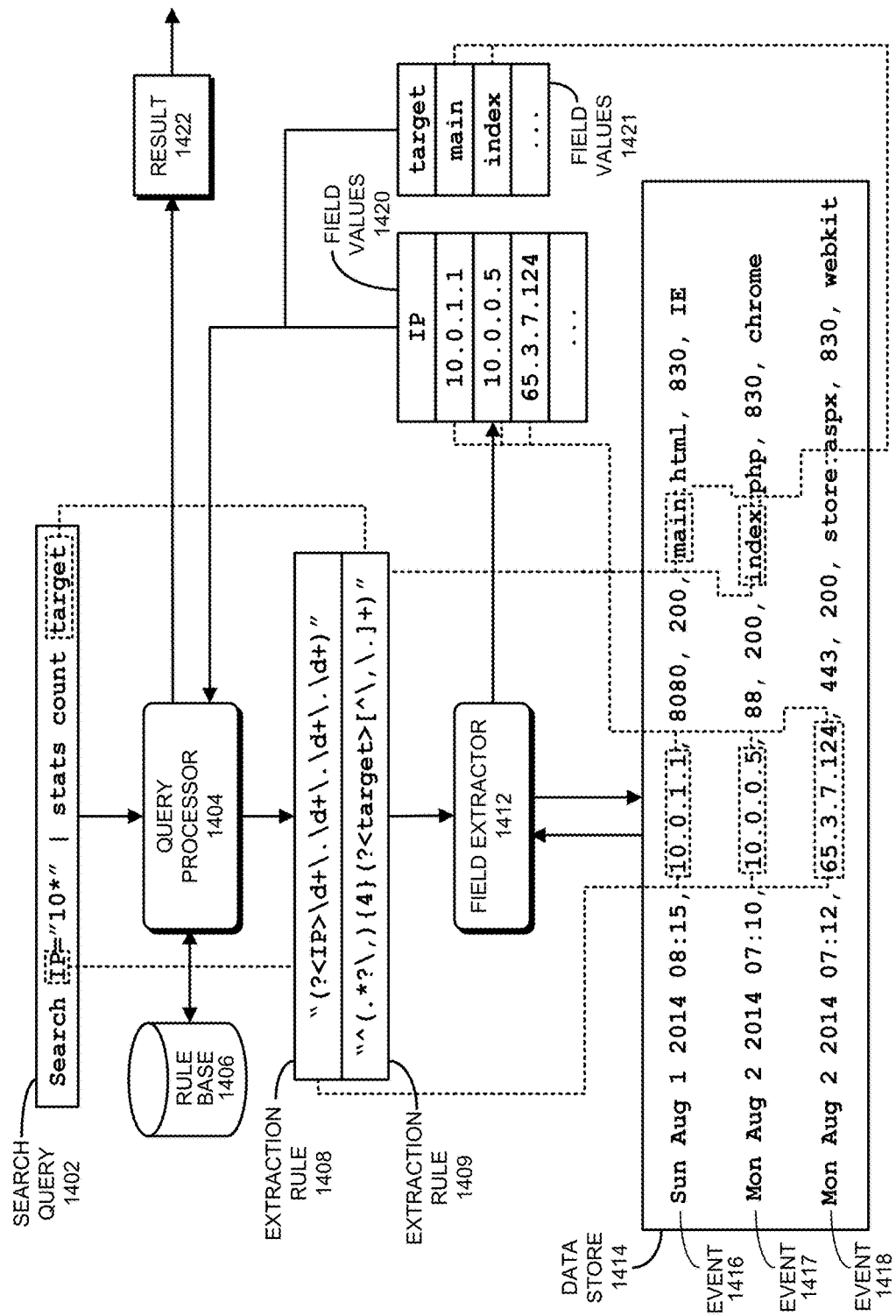
FIG. 12 presents a block diagram of an example system for processing search requests that uses extraction rules for field values in accordance with the disclosed embodiments.

FIG. 12 presents a block diagram illustrating how fields can be extracted during query processing in accordance with the disclosed embodiments. At the start of this process, a search query 1402 is received at a query processor 1404. Query processor 1404 includes various mechanisms for processing a query, wherein these mechanisms can reside in a search head 1104 and/or an indexer 1102. Note that the exemplary search query 1402 illustrated in FIG. 12 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 1402 can also be expressed in other query languages, such as the Structured Query Language (SQL) or any suitable query language.

Upon receiving search query 1402, query processor 1404 sees that search query 1402 includes two fields "IP" and "target." Query processor 1404 also determines that the values for the "IP" and "target" fields have not already been extracted from events in data store 1414, and consequently determines that query processor 1404 needs to use extraction rules to extract values for the fields. Hence, query processor 1404 performs a lookup for the extraction rules in a rule base 1406, wherein the rule base 1406 maps field names to corresponding extraction rules and obtains extraction rules 1408-1409, wherein extraction rule 1408 specifies how to extract a value for the "IP" field from an event, and extraction rule 1409 specifies how to extract a value for the "target" field from an event. As is illustrated in FIG. 12, extraction rules 1408-1409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or a value retrieved by the extraction rule. For example, a transformation rule may truncate a character string, or convert the character string into a different data format. In some cases, the query itself can specify one or more extraction rules.

Next, query processor 1404 sends extraction rules 1408-1409 to a field extractor 1412, which applies extraction rules 1408-1409 to events 1416-1418 in a data store 1414. Note that data store 1414 can include one or more data stores, and extraction rules 1408-1409 can be applied to large numbers of events in data store 1414, and are not meant to be limited to the three events 1416-1418 illustrated in FIG. 12. Moreover, the query processor 1404 can instruct field extractor 1412 to apply the extraction rules to all of the events in a data store 1414, or to a subset of the events that have been filtered based on some criteria.

Next, field extractor 1412 applies extraction rule 1408 for the first command "Search IP="10*"" to events in data store 1414 including events 1416-1418. Extraction rule 1408 is used to extract values for the IP address field from events in data store 1414 by looking for a pattern of one or more digits, followed by a period, followed again by one or more digits, followed by another period, followed again by one or more digits, followed by another period, and followed again by one or more digits. Next, field extractor 1412 returns field values 1420 to query processor 1404, which uses the criterion IP="10*" to look for IP addresses that start with "10". Note that events 1416 and 1417 match this criterion, but event 1418 does not, so the result set for the first command is events 1416-1417.

Query processor 1404 then sends events 1416-1417 to the next command "stats count target." To process this command, query processor 1404 causes field extractor 1412 to apply extraction rule 1409 to events 1416-1417. Extraction rule 1409 is used to extract values for the target field for events 1416-1417 by skipping the first four commas in events 1416-1417, and then extracting all of the following characters until a comma or period is reached. Next, field extractor 1412 returns field values 1421 to query processor 1404, which executes the command "stats count target" to count the number of unique values contained in the target fields, which in this example produces the value "2" that is returned as a final result 1422 for the query.

Note that the query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or a chart, generated from the values.

1.6 Exemplary Search Screen

Figure 14A:
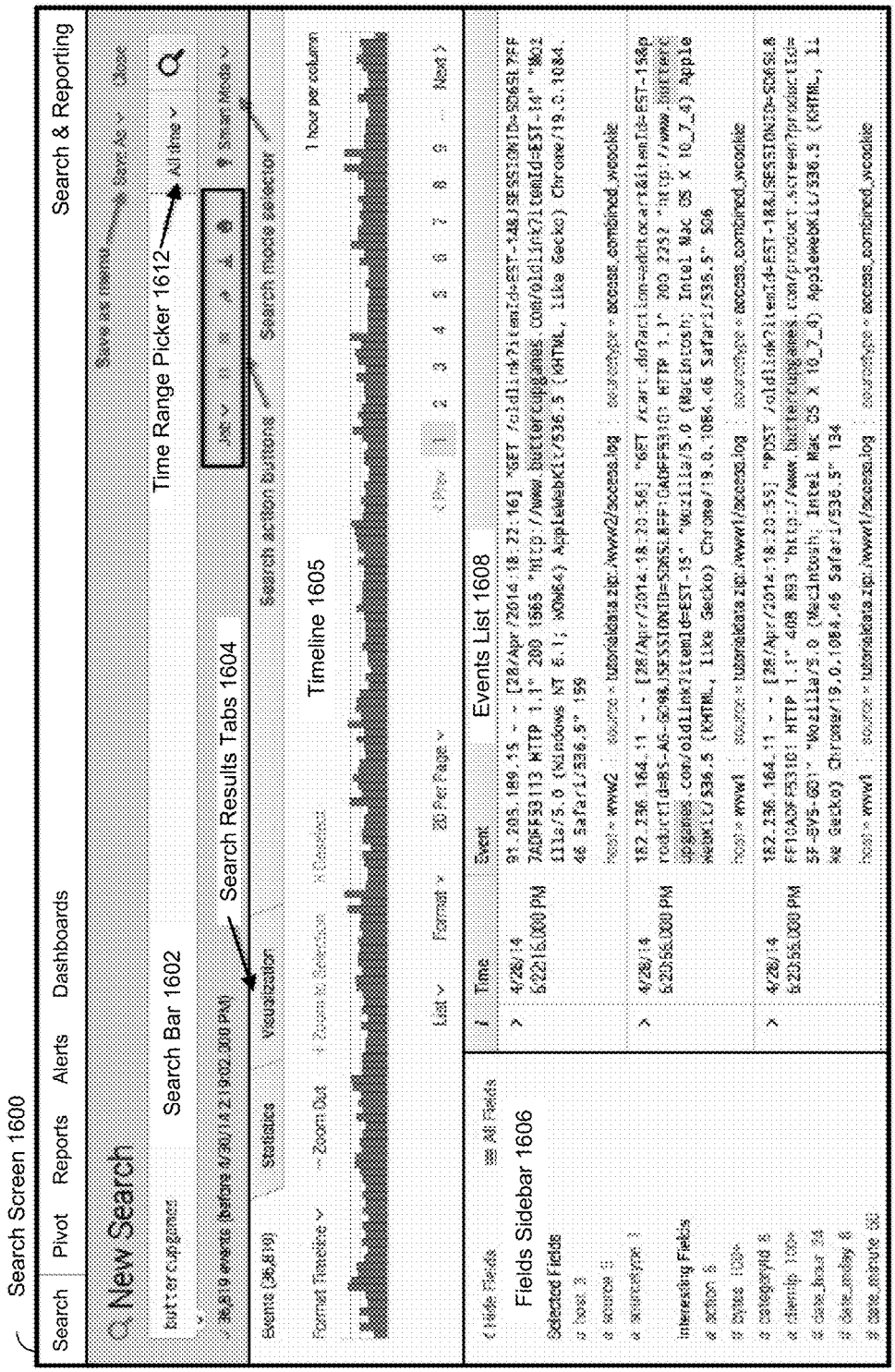
FIG. 14A illustrates an example search screen in accordance with the disclosed embodiments.
Figure 14B:
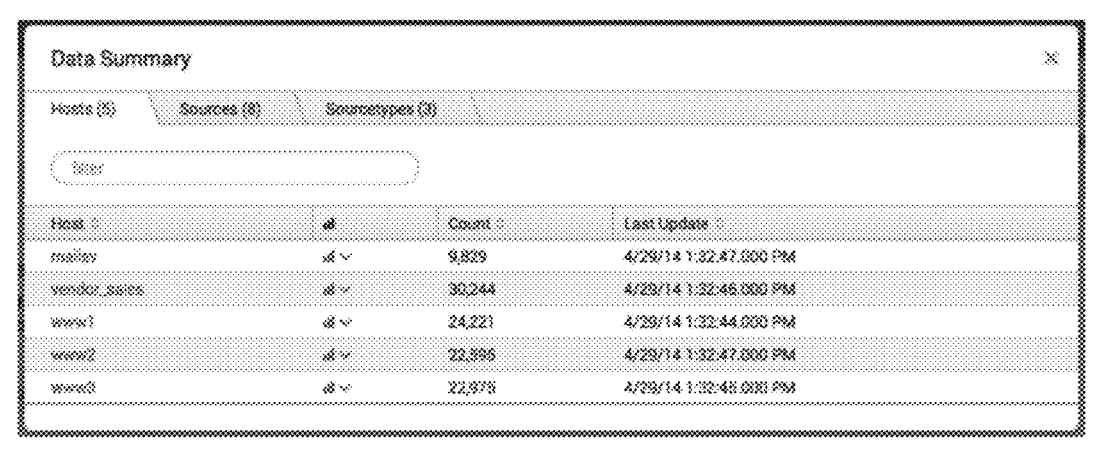

FIG. 14A illustrates an exemplary search screen 1600 in accordance with the disclosed embodiments. Search screen 1600 includes a search bar 1602 that accepts user input in the form of a search string. It also includes a time range picker 1612 that enables the user to specify a time range for the search. For "historical searches," the user can select a specific time range, or alternatively a relative time range, such as "today," "yesterday," or "last week." For "real-time searches," the user can select the size of a preceding time window to search for real-time events. Search screen 1600 also initially displays a "data summary" dialog as is illustrated in FIG. 14B that enables the user to select different sources for the event data, for example, by selecting specific hosts and log files.

After the search is executed, the search screen 1600 can display the results through search results tabs 1604, wherein search results tabs 1604 include: an "events tab" that displays various information about events returned by the search; a "statistics tab" that displays statistics about the search results; and a "visualization tab" that displays various visualizations of the search results. The events tab illustrated in FIG. 14A displays a timeline graph 1605 that graphically illustrates the number of events that occurred in one-hour intervals over the selected time range. It also displays an events list 1608 that enables a user to view the raw data in each of the returned events. It additionally displays a fields sidebar 1606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3)

using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 13 illustrates how a search query 1501 received from a client at search head 1104 can split into two phases, including: (1) a "map phase" comprising subtasks 1502 (e.g., data retrieval or simple filtering) that may be performed in parallel and are "mapped" to indexers 1102 for execution, and (2) a "reduce phase" comprising a merging operation 1503 to be executed by the search head when the results are ultimately collected from the indexers.

During operation, upon receiving search query 1501, search head 1104 modifies search query 1501 by substituting "stats" with "prestats" to produce search query 1502, and then distributes search query 1502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 9, or may alternatively distribute a modified version (e.g., a more restricted version) of the search query to the search peers. In this example, the indexers are responsible for producing the results and sending them to the search head. After the indexers return the results to the search head, the search head performs the merging operations 1503 on the results. Note that by executing the computation in this way, the system effectively distributes the computational operations while minimizing data transfers.

1.7.2 Keyword Index

As described above with reference to the flowcharts in FIGS. 10 and 11, the event-processing system 1100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of the system 1100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014, which is hereby incorporated by reference.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether the generation of updated reports can be accelerated by creating intermediate summaries. (This is possible if results from preceding time periods can be computed separately and combined to generate an updated report. In some cases, it is not possible to combine such incremental results, for example, where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that matches the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011, which are hereby incorporated by reference.

1.8 Security Features

The SPLUNK® ENTERPRISE platform provides various schemas, dashboards, and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (STEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volumes, uniform resource locator strings, and source addresses. The process of detecting security threats for network-related information is further described in U.S. patent application Ser. Nos. 13/956,252, and 13/956,262, which are hereby incorporated by reference. Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 15A:
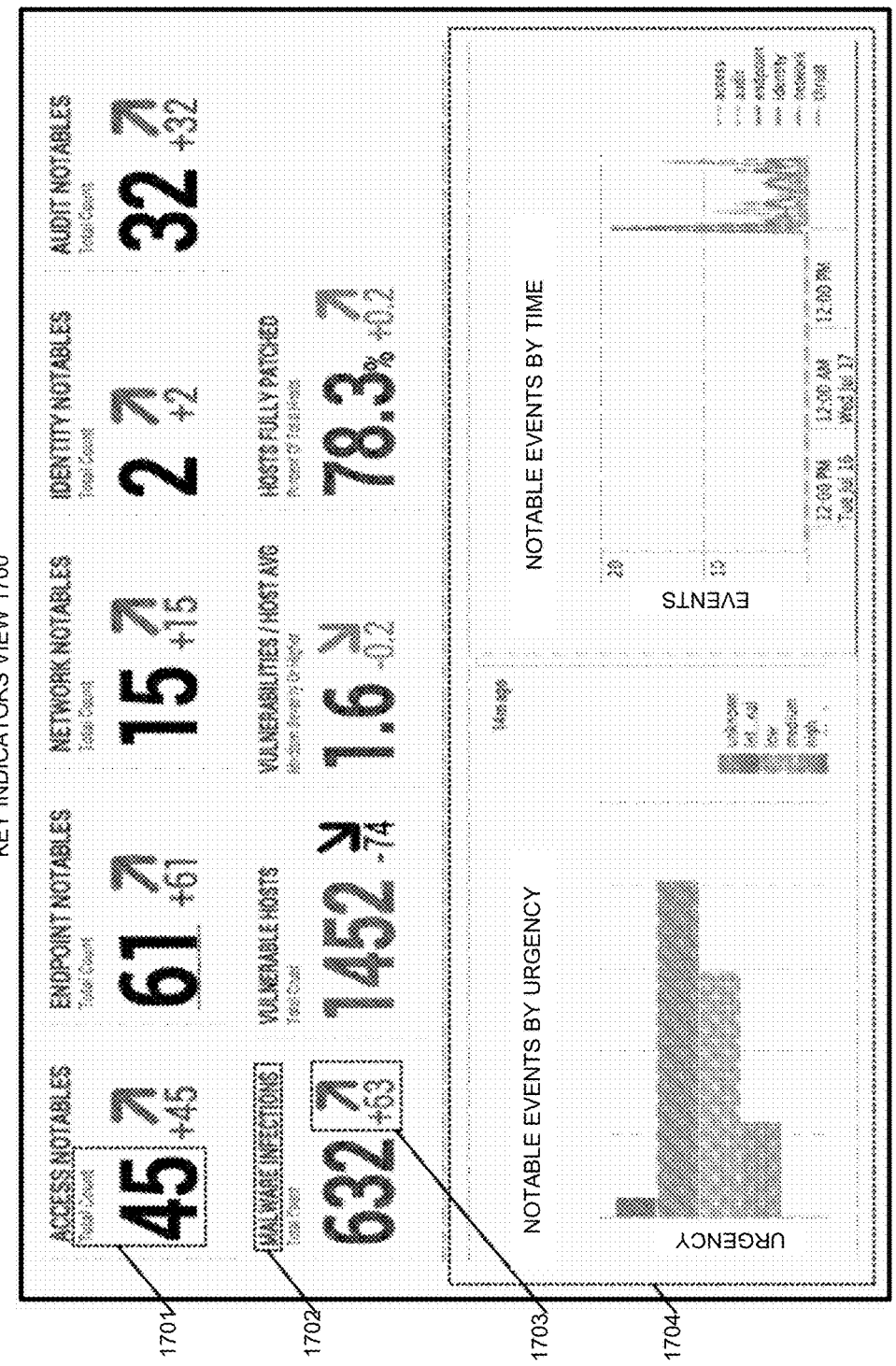
FIG. 15A illustrates an example key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 15A illustrates an exemplary key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338 filed Jul. 31, 2013, which is hereby incorporated by reference.

Figure 15B:
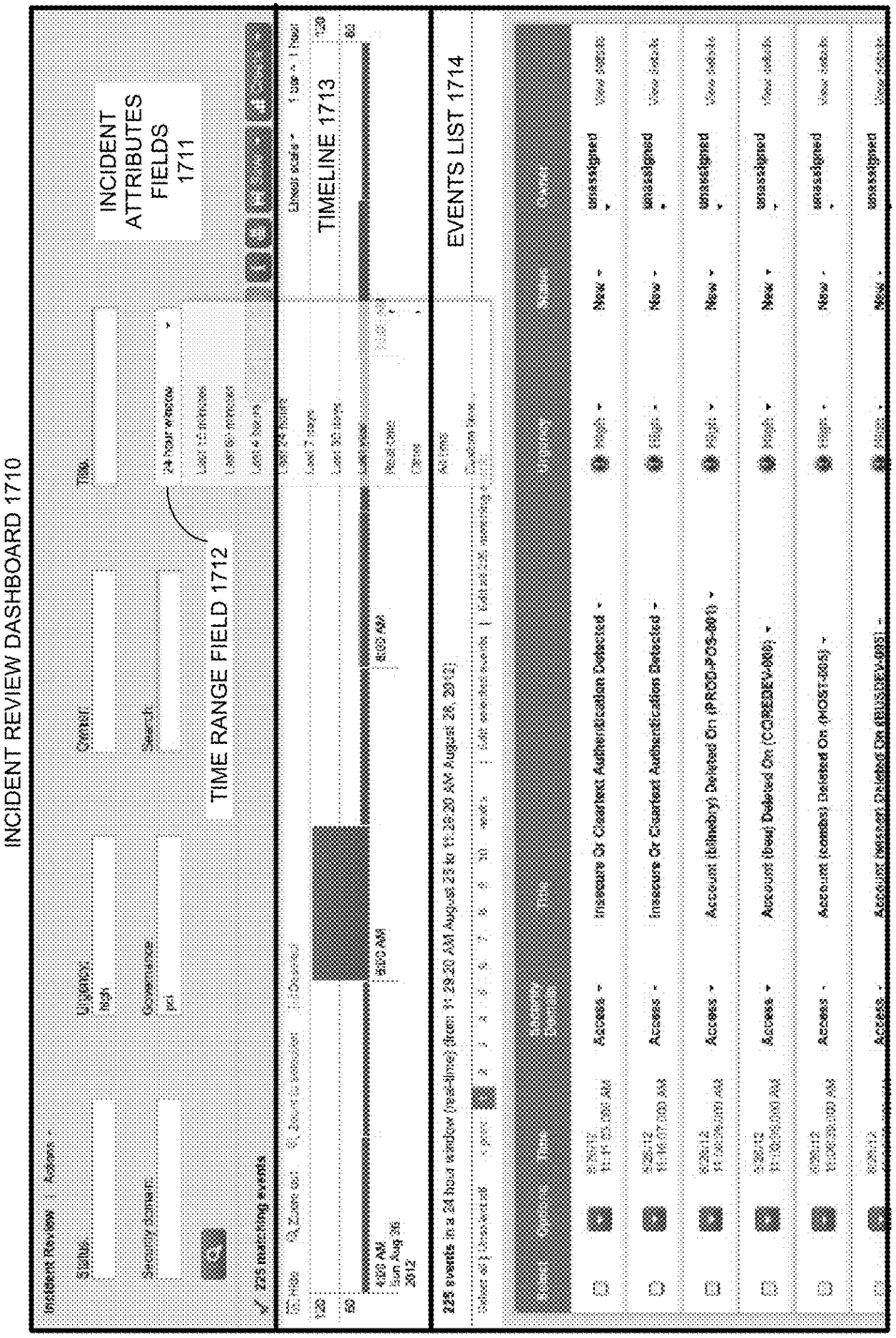
FIG. 15B illustrates an example incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 15B illustrates an exemplary incident review dashboard 1710 that includes a set of incident attribute fields 1711 that, for example, enables a user to specify a time range field 1712 for the displayed events. It also includes a timeline 1713 that graphically illustrates the number of incidents that occurred in one-hour time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example, by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed Jan. 29, 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 15C:
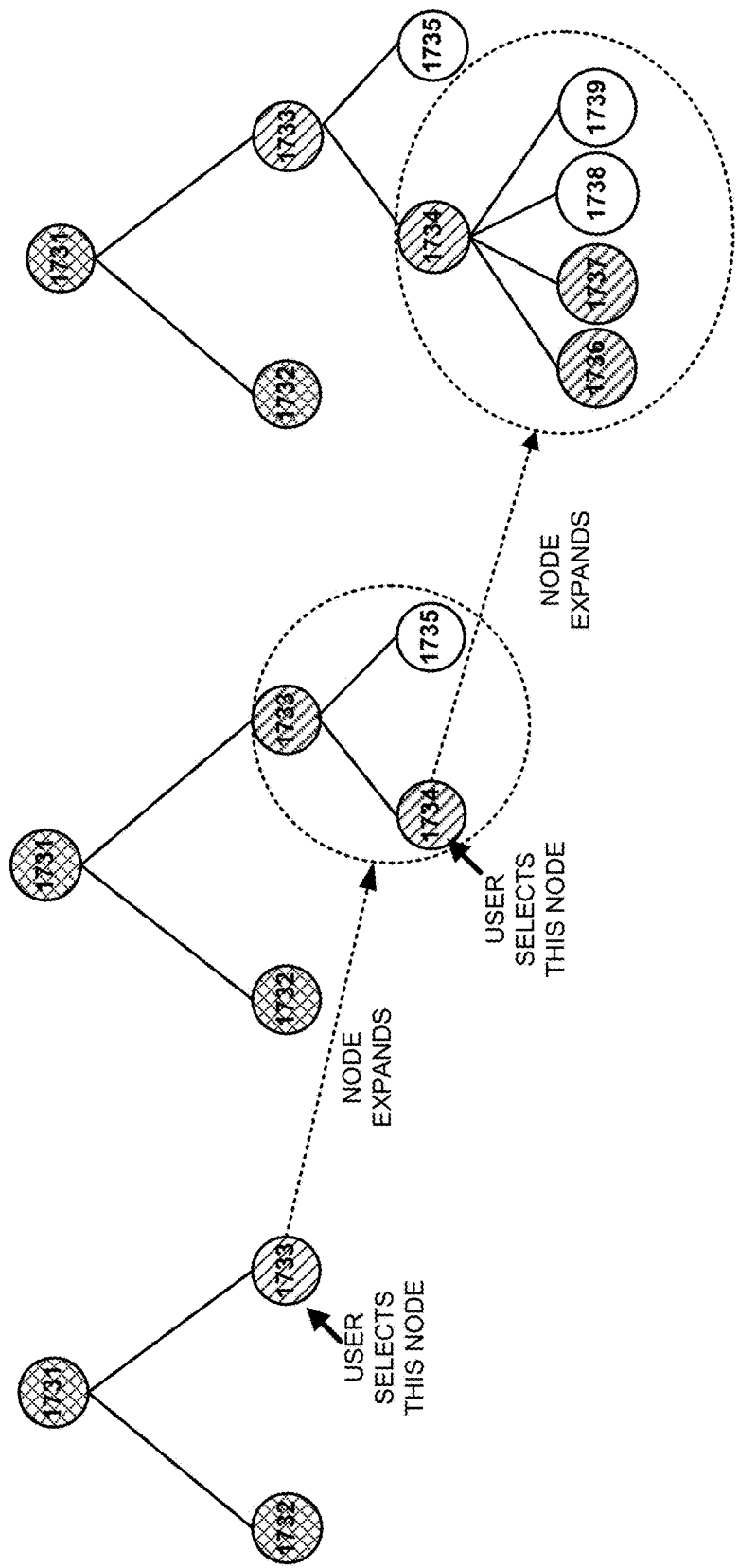
FIG. 15C illustrates an example proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 15C, wherein nodes 1733 and 1734 are selectively expanded. Note that nodes 1731-1739 can be displayed using different patterns or colors to represent different performance states, such as a critical state, a warning state, a normal state, or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on Apr. 15, 2014, which is hereby incorporated by reference.

Figure 15D:
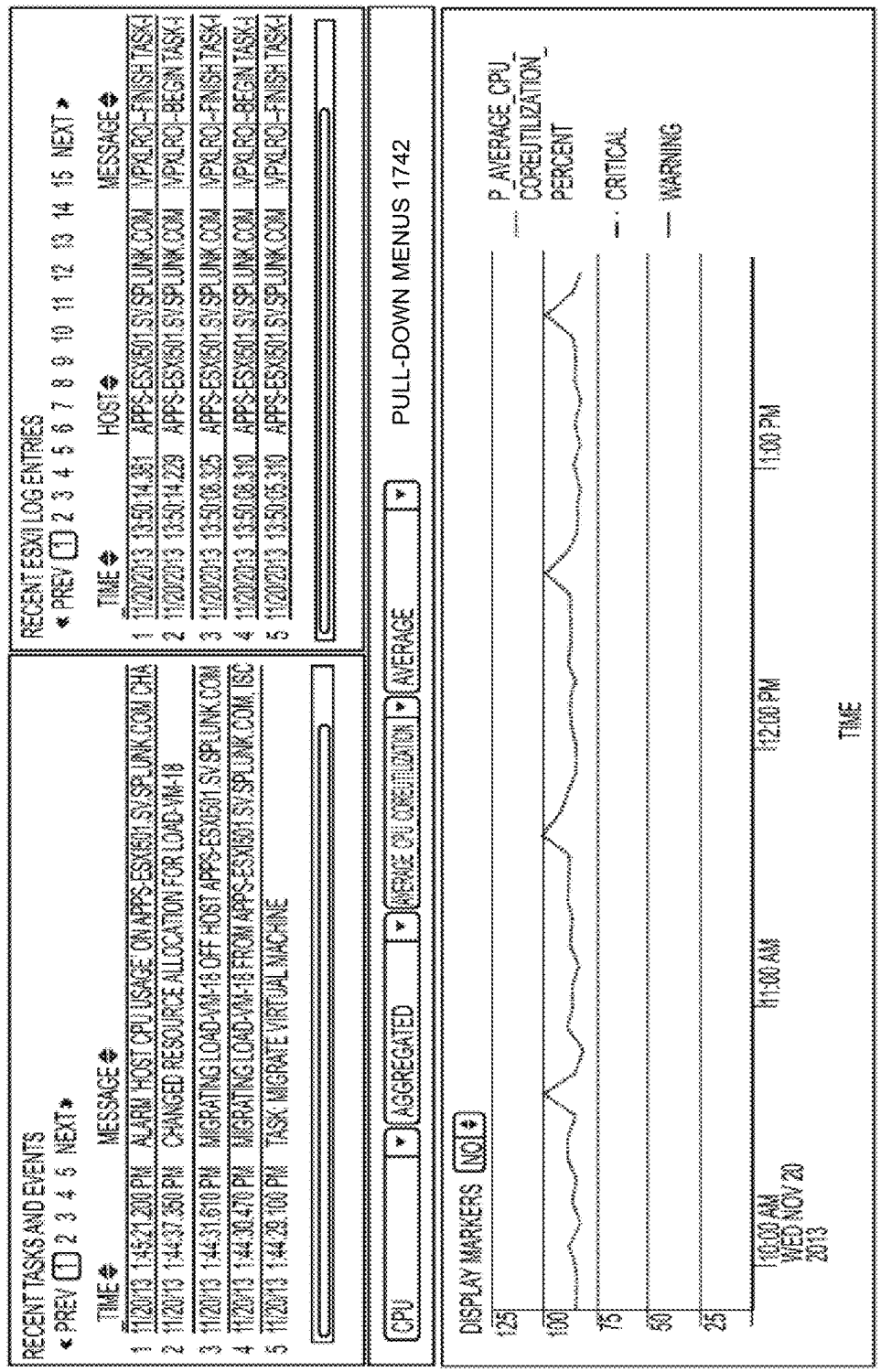
FIG. 15D illustrates an example screen displaying both log data and performance data in accordance with the disclosed embodiments.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 15D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on Jan. 29, 2014, which is hereby incorporated by reference.

Further modifications and embodiments of various aspects of the disclosure will be apparent to those skilled in the art in view of this description. Accordingly, this description is to be construed as illustrative only and is for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

It will be appreciated that the methods described are example embodiments of methods that may be employed in accordance with the techniques described herein. The methods may be modified to facilitate variations of their implementation and use. The order of the methods and the operations provided therein may be changed, and various elements may be added, reordered, combined, omitted, modified, etc. Portions of the methods may be implemented in software, hardware, or a combination thereof. Some or all of the portions of the methods may be implemented by one or more of the processors/modules/applications described herein.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method comprising:
in response to a request, displaying, by a server computer, an index management graphical user interface (GUI) comprising one or more user editable interactive elements for receiving one or more user specified index settings for managing storage of indexed machine data in one or more indexes of a machine data processing system;
receiving, by the server computer via the one or more user editable interactive elements of the index management GUI, the one or more user specified index settings;
generating, by the server computer, an index configuration file including an index definition comprising a user specified manner in which to index incoming raw machine data that is subsequently received by the machine data processing system to generate indexed machine data that is searchable data in the one or more indexes of the machine data processing system, the user specified manner corresponding to the one or more user specified index settings; and
automatically causing, by the server computer via a network, distributing of the index configuration file in a hierarchical manner to two or more indexers of the machine data processing system that causes the index definition to be synchronized on the two or more indexers, wherein the distributing of the index configuration file is a single distribution of the index definition that effectuates a first change in association with a first indexer of the two or more indexers and a second change in association with a second indexer of the two or more indexers, and causes the two or more indexers to index the raw machine data in accordance with the index definition to generate the indexed machine data, wherein the distributing comprises pushing the index configuration file to a master node of at least one of the first indexer and the second indexer, the master node being part of the machine data processing system.

2. The method of claim 1, wherein the user specified manner specifies a maximum storage size for an index the two or more indexers.

3. The method of claim 1, wherein the single distribution causes the two or more indexers to index the raw machine data according to the user specified manner.

4. The method of claim 1, wherein the pushing of the index configuration file is to a first master node of the first indexer and a second master node of the second indexer, the first master node, the second master node, and the server computer each being part of the machine data processing system.

5. The method of claim 1, wherein the distributing of the index configuration file comprises providing the index configuration file to a first cluster of indexers comprising the first indexer and a second cluster of indexers comprising the second indexer.

6. The method of claim 1, wherein the distributing of the index configuration file is to a master node indexer of a cluster comprising the first indexer, and the master node indexer distributes the configuration file to a plurality of nodes of the cluster.

7. The method of claim 1, wherein the distributing of the index configuration file causes a search head of a cluster of indexers comprising the first indexer to use the index definition to distribute search tasks on the indexed machine data to at least some of the indexers of the cluster and merge search results of the search tasks from the at least some of the indexers.

8. The method of claim 1, wherein the one or more user specified index settings edit at least an existing index of the two or more indexers, and the user specified manner comprises at least one of a maximum storage size for the existing index, a retention policy for the existing index, and an access policy for the existing index, and at least one of the one or more user editable interactive elements is pre-populated with a current index setting for the existing index.

9. The method of claim 1, wherein the one or more user specified index settings edit at least an existing index of the two or more indexers, and the index management GUI comprises a count of events stored in the existing index, a time of an earliest event in the existing index, and a time of a latest event in the existing index.

10. The method of claim 1, wherein the one or more user specified index settings create at least a new index by at least one of the two or more indexers, and at least one of the one or more user editable interactive elements is pre-populated with a default index setting for the new index.

11. The method of claim 1, wherein the user specified manner defines when data in an index is to be discarded based on an age of the data and a time that is user provided to the one or more user editable interactive elements.

12. The method of claim 1, further comprising causing display of an index overview GUI comprising:
user selectable interactive elements to navigate to the index management GUI; and
a listing of existing indexes of the two or more indexers, wherein the listing of existing indexes comprises at least one of the following for each of the existing indexes:
a name of the index, a maximum storage size of the index, a current size of the index, a retention policy for the index, a count of events in the index, a time of an earliest event in the index, a time of a latest event in the index, an application associated with the index, and a status of the index.

13. The method of claim 1, wherein the user specified manner defines a maximum storage size based on a user provided storage quantity entered into the one or more user editable interactive elements, and wherein using the user specified manner, data is caused to be removed from an index of the one or more indexes as a result of the two or more indexers receiving the raw machine data based on an age of the data.

14. The method of claim 1, further comprising causing display of an index progress GUI indicating progress of applying the one or more user specified index settings to the two or more indexers.

15. The method of claim 1, wherein the distributing of the index configuration file causes the distributed index configuration file to replace a previous version of the index configuration file that is stored at the first indexer.

16. The method of claim 1, wherein the distributing of the index configuration file causes deletion of at least one existing index by an indexer of the two or more indexers based on the index definition not including the existing index.

17. The method of claim 1, wherein the user specified manner causes at least one of the two or more indexers to delete a raw data file contained in an index, the raw data file comprising at least some of the raw machine data in compressed form.

18. The method of claim 1, wherein the index definition comprises a definition of a new index based on the one or more user specified index settings.

19. The method of claim 1, wherein the distributing of the index configuration file is based on a request from at least one of the two or more indexers.

20. The method of claim 1, wherein the two or more indexers limit access to data stored in the one or more indexes based at least in part on the index definition.

21. The method of claim 1, further comprising automatically causing, by the server computer via a network, distribution of the index definition to a forwarder of the machine data processing system, the forwarder collecting the raw machine data from a plurality of sources, and determining for each data item corresponding to the raw machine data, which of the two or more indexers will receive the data item for indexing based on the index definition.

22. A computer-implemented system comprising:
one or more processors; and
one or more memories comprising program instructions stored thereon that are executable by the one or more processors to perform operations comprising:
in response to a request, displaying, by a server computer, an index management graphical user interface (GUI) comprising one or more user editable interactive elements for receiving one or more user specified index settings for managing storage of indexed machine data in one or more indexes of a machine data processing system;
receiving, by the server computer via the one or more user editable interactive elements of the index management GUI, the one or more user specified index settings;
generating, by the server computer, an index configuration file including an index definition comprising a user specified manner in which to index incoming raw machine data that is subsequently received by the machine data processing system to generate indexed machine data that is searchable data in the one or more indexes of the machine data processing system, the user specified manner corresponding to the one or more user specified index settings; and
automatically causing, by the server computer via a network, distributing of the index configuration file in a hierarchical manner to two or more indexers of the machine data processing system that causes the index definition to be synchronized on the two or more indexers, wherein the distributing of the index configuration file is a single distribution of the index definition that effectuates a first change in association with a first indexer of the two or more indexers and a second change in association with a second indexer of the two or more indexers, and causes the two or more indexers to index the raw machine data in accordance with the index definition to generate the indexed machine data, wherein the distributing comprises pushing the index configuration file to a master node of at least one of the first indexer and the second indexer, the master node being part of the machine data processing system.

23. The system of claim 22, wherein the pushing of the index configuration file is to a first master node of the first indexer and a second master node of the second indexer, the first master node and the second master node each being part of the machine data processing system.

24. The system of claim 22, wherein the distributing of the index configuration file comprises providing the index configuration file to a first cluster of indexers comprising the first indexer and a second cluster of indexers comprising the second indexer.

25. The system of claim 22, wherein the distributing of the index configuration file is to a master node indexer of a cluster comprising the first indexer, and the master node indexer distributes the configuration file to a plurality of nodes of the cluster.

26. The system of claim 22, wherein the distributing of the index configuration file causes a search head of a cluster of indexers comprising the first indexer to use the index definition to distribute search tasks on the indexed machine data to at least some of the indexers of the cluster and merge search results of the search tasks from the at least some of the indexers.

27. One or more non-transitory computer-readable media comprising program instructions stored thereon that are executable by one or more processors to perform operations comprising:
in response to a request, displaying, by a server computer, an index management graphical user interface (GUI) comprising one or more user editable interactive elements for receiving one or more user specified index settings for managing storage of indexed machine data in one or more indexes of a machine data processing system;
receiving, by the server computer via the one or more user editable interactive elements of the index management GUI, the one or more user specified index settings;
generating, by the server computer, an index configuration file including an index definition comprising a user specified manner in which to index incoming raw machine data that is subsequently received by the machine data processing system to generate indexed machine data that is searchable data in the one or more indexes of the machine data processing system, the user specified manner corresponding to the one or more user specified index settings; and
automatically causing, by the server computer via a network, distributing of the index configuration file in a hierarchical manner to two or more indexers of the machine data processing system that causes the index definition to be synchronized on the two or more indexers, wherein the distributing of the index configuration file is a single distribution of the index definition that effectuates a first change in association with a first indexer of the two or more indexers and a second change in association with a second indexer of the two or more indexers, and causes the two or more indexers to index the raw machine data in accordance with the index definition to generate the indexed machine data, wherein the distributing comprises pushing the index configuration file to a master node of at least one of the first indexer and the second indexer, the master node being part of the machine data processing system.

28. The computer-readable media of claim 27, wherein the pushing of the index configuration file is to a first master node of the first indexer and a second master node of the second indexer, the first master node and the second master node each being part of the machine data processing system.

29. The computer-readable media of claim 27, wherein the distributing of the index configuration file comprises providing the index configuration file to a first cluster of indexers comprising the first indexer and a second cluster of indexers comprising the second indexer.

30. The computer-readable media of claim 27, wherein the distributing of the index configuration file is to a master node indexer of a cluster comprising the first indexer, and the master node indexer distributes the configuration file to a plurality of nodes of the cluster.

31. The computer-readable media of claim 27, wherein the distributing of the index configuration file causes a search head of a cluster of indexers comprising the first indexer to use the index definition to distribute search tasks on the indexed machine data to at least some of the indexers of the cluster and merge search results of the search tasks from the at least some of the indexers.

* * * * *